US008175412B2

(12) United States Patent
Basri et al.

(10) Patent No.: US 8,175,412 B2
(45) Date of Patent: May 8, 2012

(54) METHOD AND APPARATUS FOR MATCHING PORTIONS OF INPUT IMAGES

(75) Inventors: Ronen Basri, Rehovot (IL); Chen Brestel, Rehovot (IL); Meirav Galun, Rehovot (IL); Alexander Apartsin, Rehovot (IL)

(73) Assignee: Yeda Research & Development Co. Ltd., Rehovot (IL)

( * ) Notice: Subject to any disclaimer, the term of this patent is extended or adjusted under 35 U.S.C. 154(b) by 1665 days.

(21) Appl. No.: 10/598,027

(22) PCT Filed: Feb. 17, 2005

(86) PCT No.: PCT/US2005/005715
§ 371 (c)(1),
(2), (4) Date: Aug. 16, 2006

(87) PCT Pub. No.: WO2005/081178
PCT Pub. Date: Sep. 1, 2005

(65) Prior Publication Data
US 2007/0185946 A1    Aug. 9, 2007

Related U.S. Application Data

(60) Provisional application No. 60/545,709, filed on Feb. 17, 2004, provisional application No. 60/635,397, filed on Dec. 10, 2004.

(51) Int. Cl.
G06K 9/00    (2006.01)
(52) U.S. Cl. ........ 382/278; 382/175; 382/100; 382/190; 382/305
(58) Field of Classification Search .............. 382/173, 382/175, 178, 225–228, 305–307, 100, 181, 382/190–223, 278
See application file for complete search history.

(56) References Cited

U.S. PATENT DOCUMENTS 5,784,431 A * 7/1998 Kalend et al. .................. 378/65
(Continued)

OTHER PUBLICATIONS

International Search Report mailed Jul. 7, 2005 for PCT/US05/05715 filed Feb. 17, 2005.
International Prelim. Report on Patentability published Aug. 22, 2006 for PCT/US05/05715 filed Feb. 17, 2005.
Written Opinion published Aug. 17, 2006 for PCT/US05/05715 filed Feb. 17, 2005.

*Primary Examiner* — Wesley Tucker
(74) *Attorney, Agent, or Firm* — Martin Fleit; Paul D. Bianco; Fleit Gibbons Gutman Bongini & Bianco PL

(57) ABSTRACT

A method and apparatus for finding correspondence between portions of two images that first subjects the two images to segmentation by weighted aggregation (10), then constructs directed acylic graphs (16,18) from the output of the segmentation by weighted aggregation to obtain hierarchical graphs of aggregates (20,22), and finally applies a maximally weighted subgraph isomorphism to the hierarchical graphs of aggregates to find matches between them (24). Two algorithms are described; one seeks a one-to-one matching between regions, and the other computes a soft matching, in which is an aggregate may have more than one corresponding aggregate. A method and apparatus for image segmentation based on motion cues. Motion provides a strong cue for segmentation. The method begins with local, ambiguous optical flow measurements. It uses a process of aggregation to resolve the ambiguities and reach reliable estimates of the motion. In addition, as the process of aggregation proceeds and larger aggregates are identified, it employs a progressively more complex model to describe the motion. In particular, the method proceeds by recovering translational motion at fine levels, through affine transformation at intermediate levels, to 3D motion (described by a fundamental matrix) at the coarsest levels. Finally, the method is integrated with a segmentation method that uses intensity cues. The utility of the method is demonstrated on both random dot and real motion sequences.

24 Claims, 24 Drawing Sheets

U.S. PATENT DOCUMENTS 6,639,596 B1 * 10/2003 Shum et al. .................. 345/427
2001/0043738 A1 * 11/2001 Sawhney et al. ............. 382/154
2004/0013305 A1 * 1/2004 Brandt et al. ................. 382/224

* cited by examiner

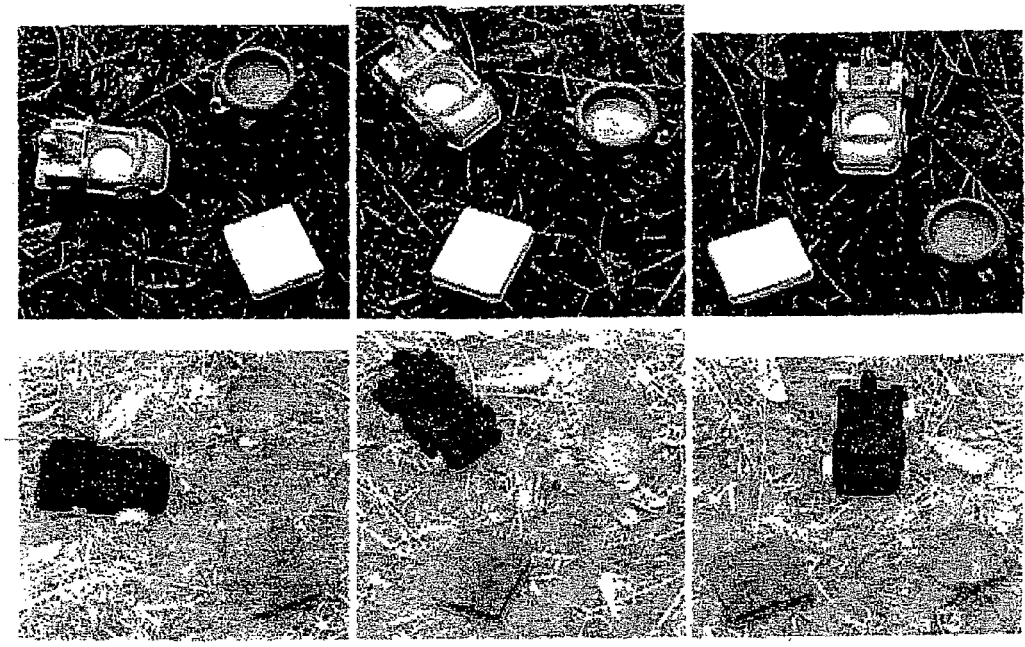
Figure 1  Original images separated by a 3D rotation of 45° and 90° (top) and matching results (bottom), displayed in same colors).
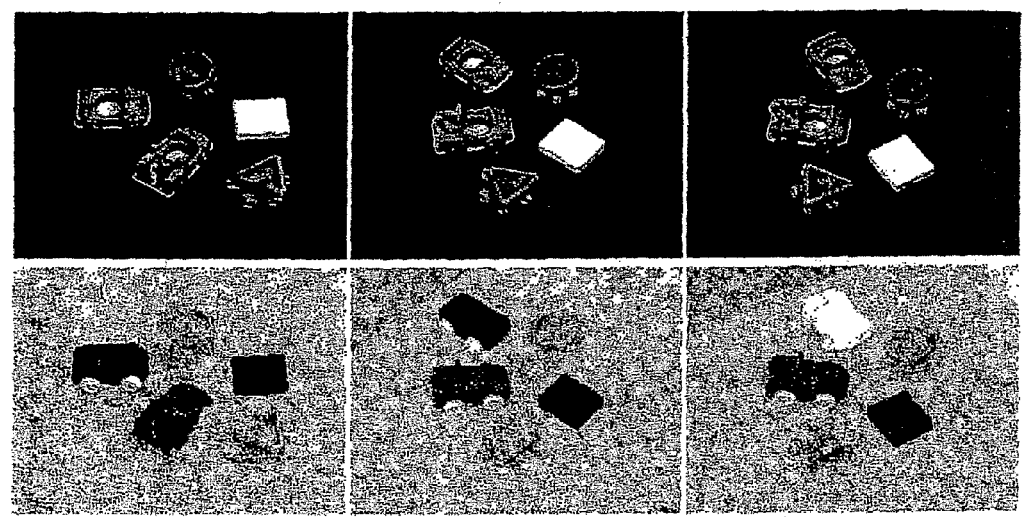
Figure 2  Original images separated by a 3D rotation of 45° and 60° (top) and matching results (bottom).

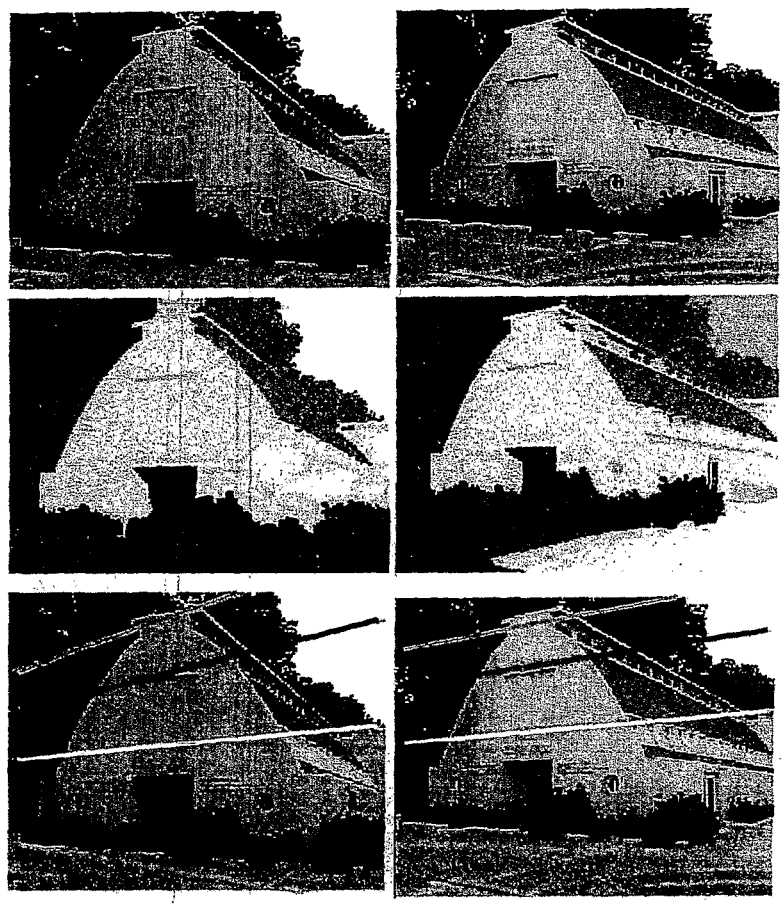
Figure 3: Original images (top), matched aggregates (middle) and epipolar lines (bottom).

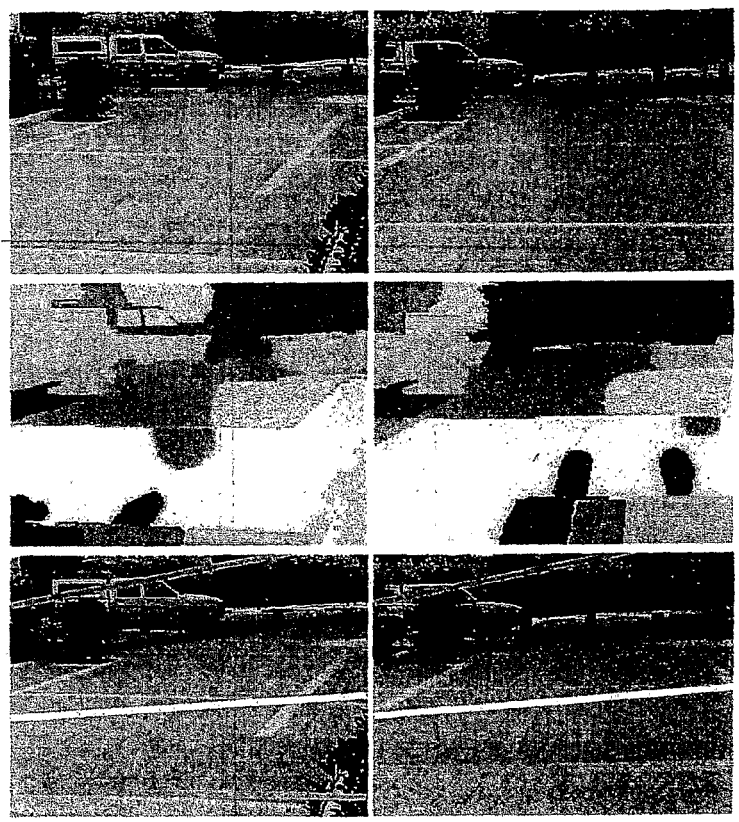
Figure 4 Original images (top), matched aggregates (middle) and epipolar lines (bottom).

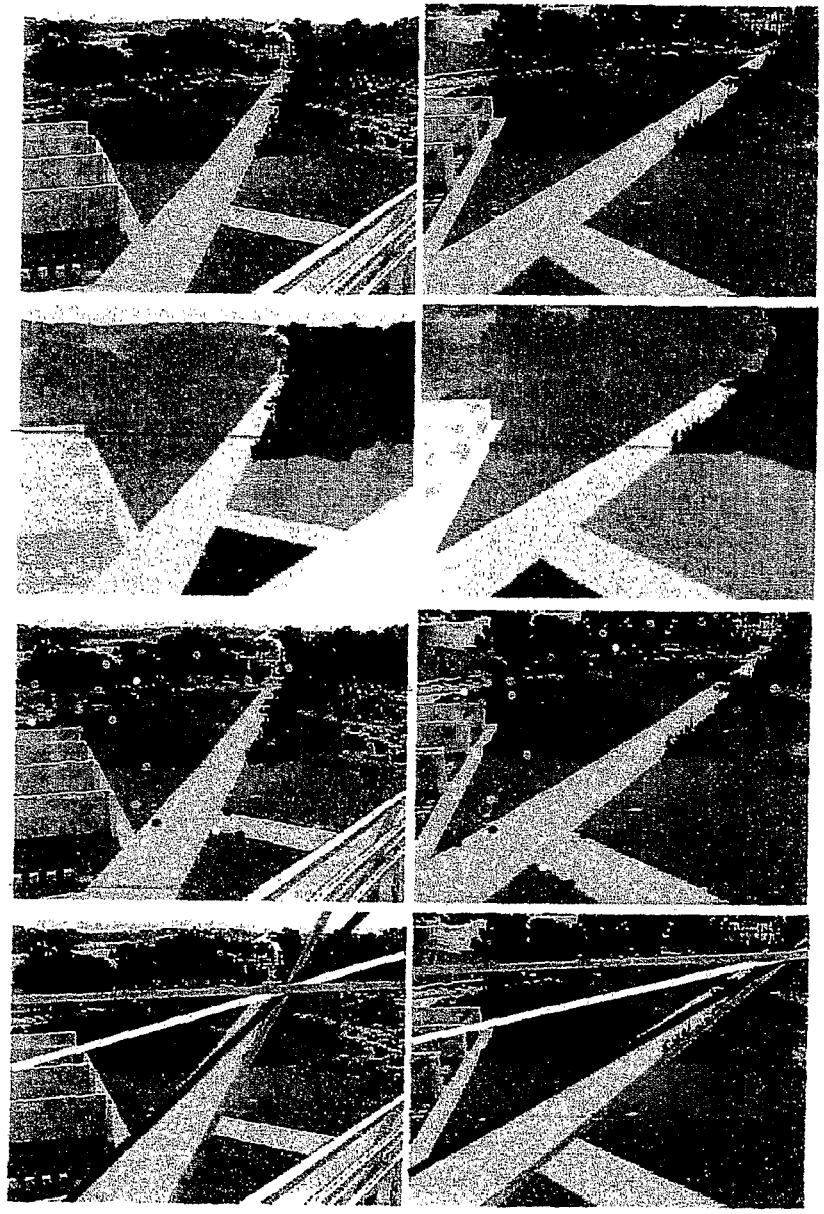
Figure 5 - Original images (top), matched aggregates (2nd row), some of the matching aggregates centroids used for RANSAC (3rd row) and epipolar lines (bottom).

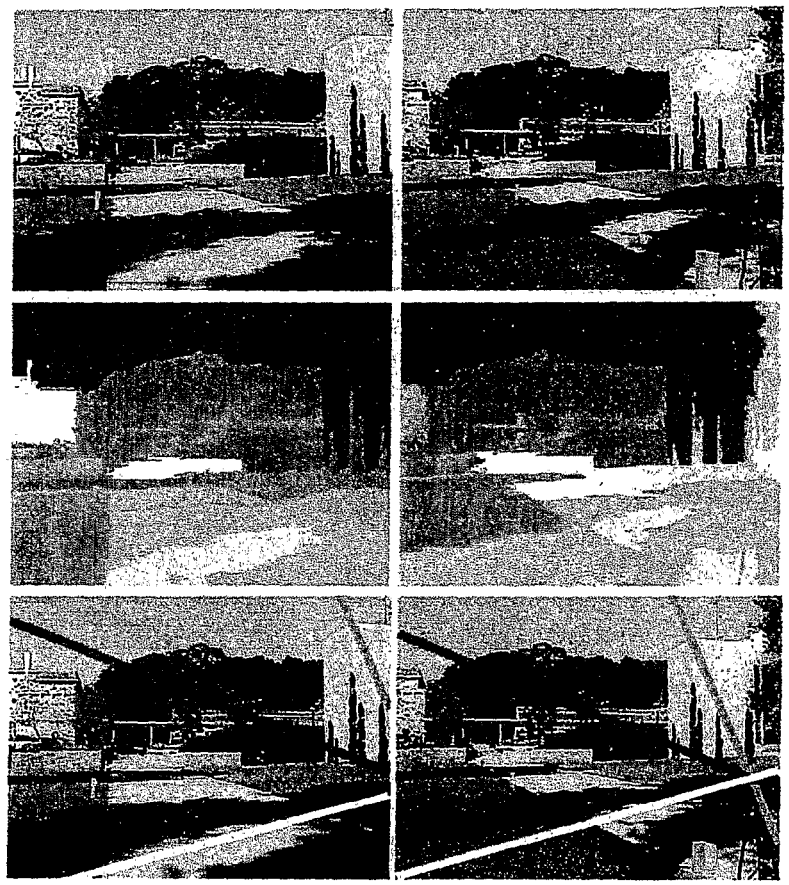
Figure 6 Original images (top, notice the tripod at the bottom right corner), matched aggregates (middle) and epipolar lines (bottom).

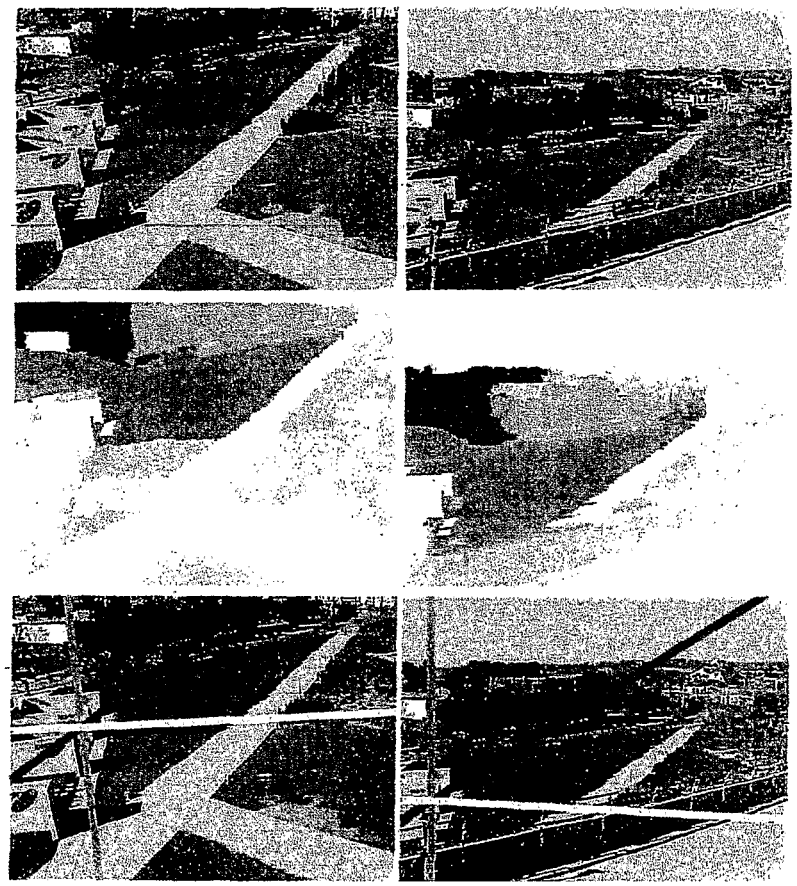
Figure 7 Original images (top, notice the tripod at the bottom left corner), matched aggregates (middle) and epipolar lines (bottom).

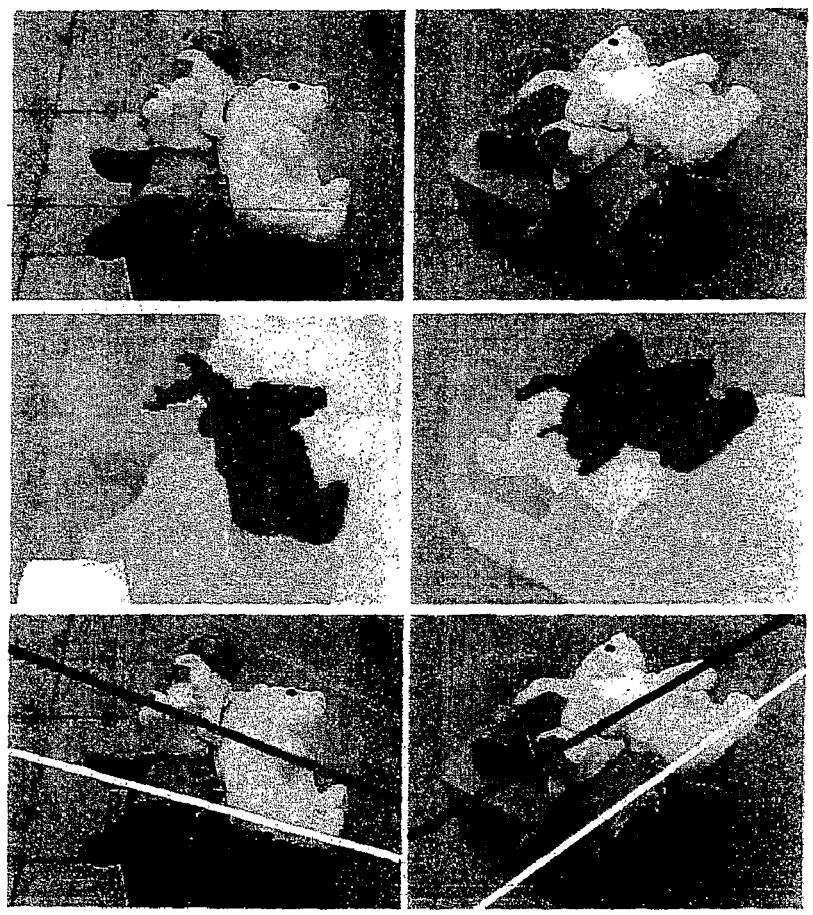
Figure 8 Original images (top), matched aggregates (middle) and epipolar lines (bottom).

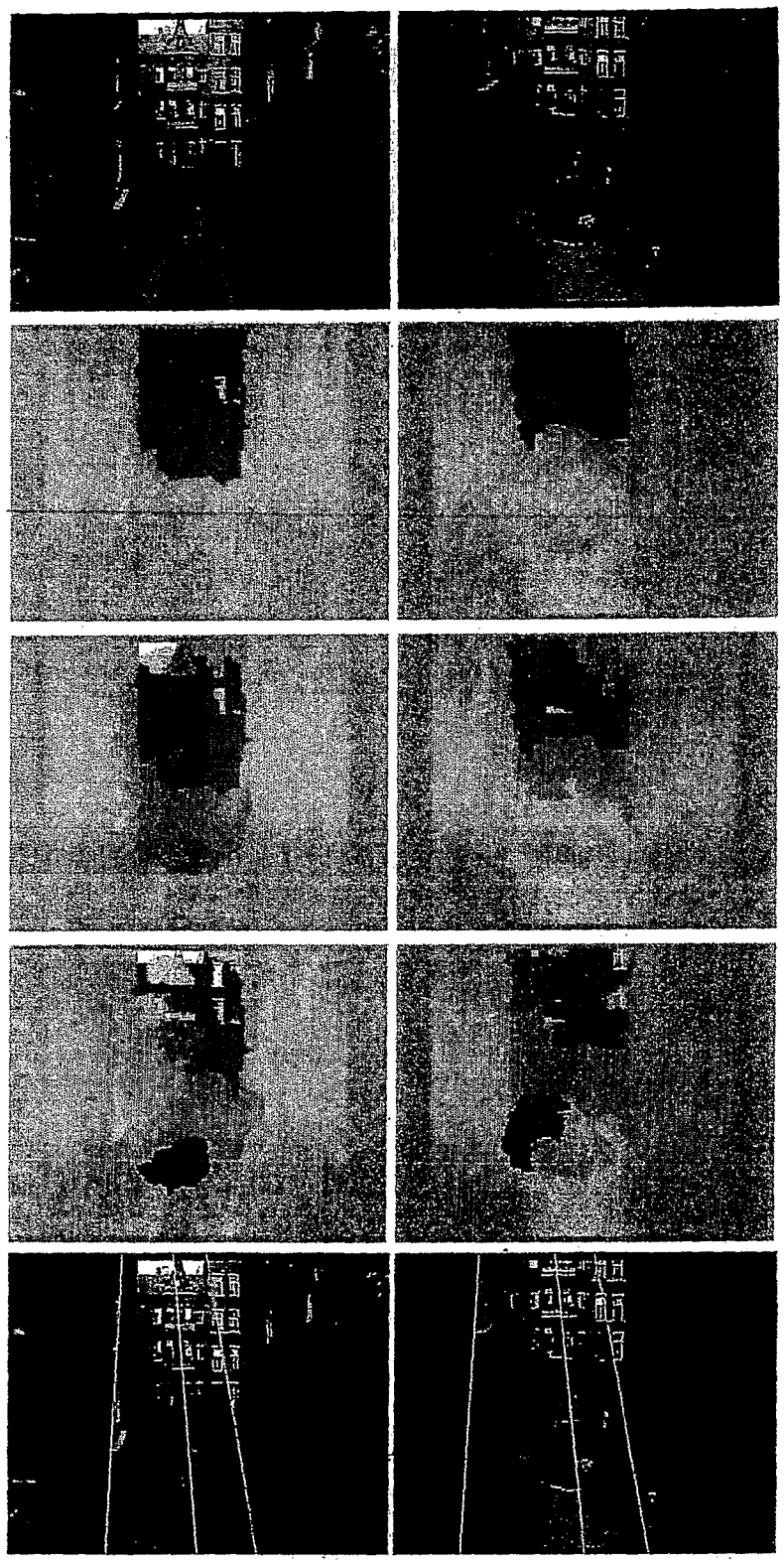
Figure 9 Original images: "Lola1", "Lola2" (top), matched aggregates in scales 10, 9 and 8 (middle) and epipolar lines (bottom).

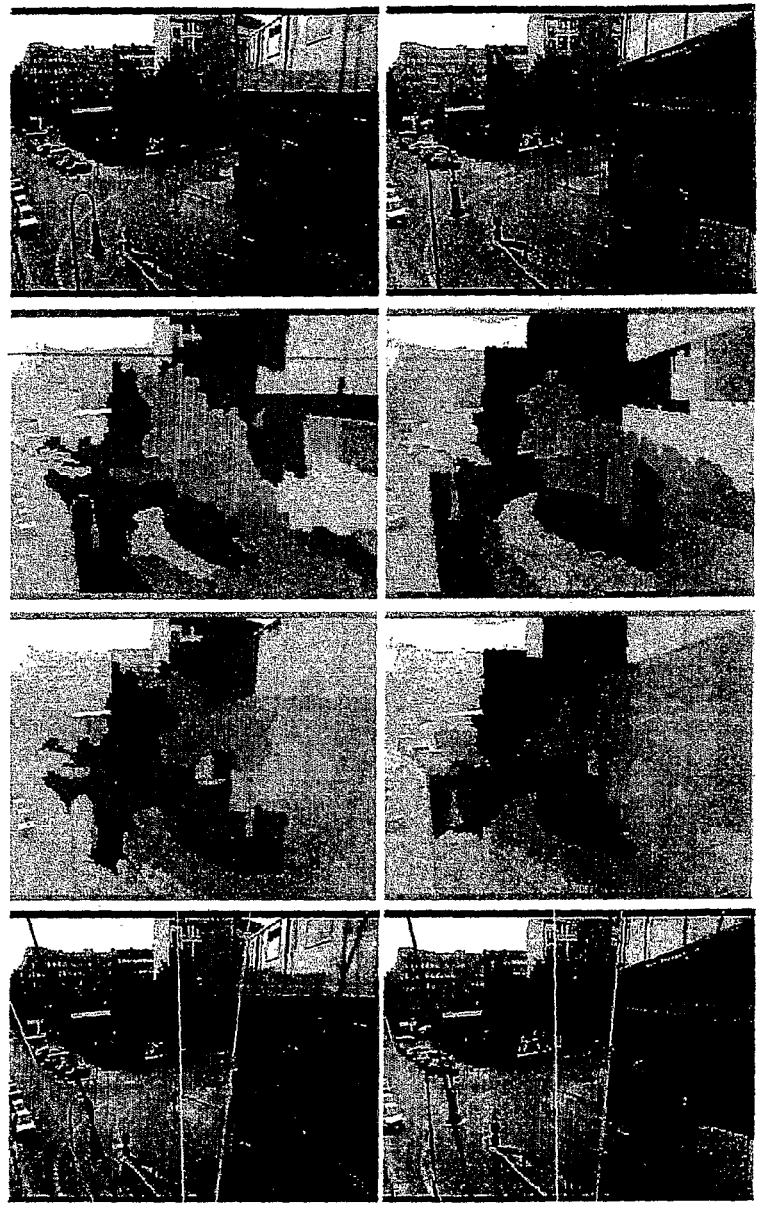
Figure .10: Original images: "Lola3", "Lola4" (top), matched aggregates in scale 9 using: fundamental matrix (2nd row), soft matching (3rd row), and epipolar lines (bottom).

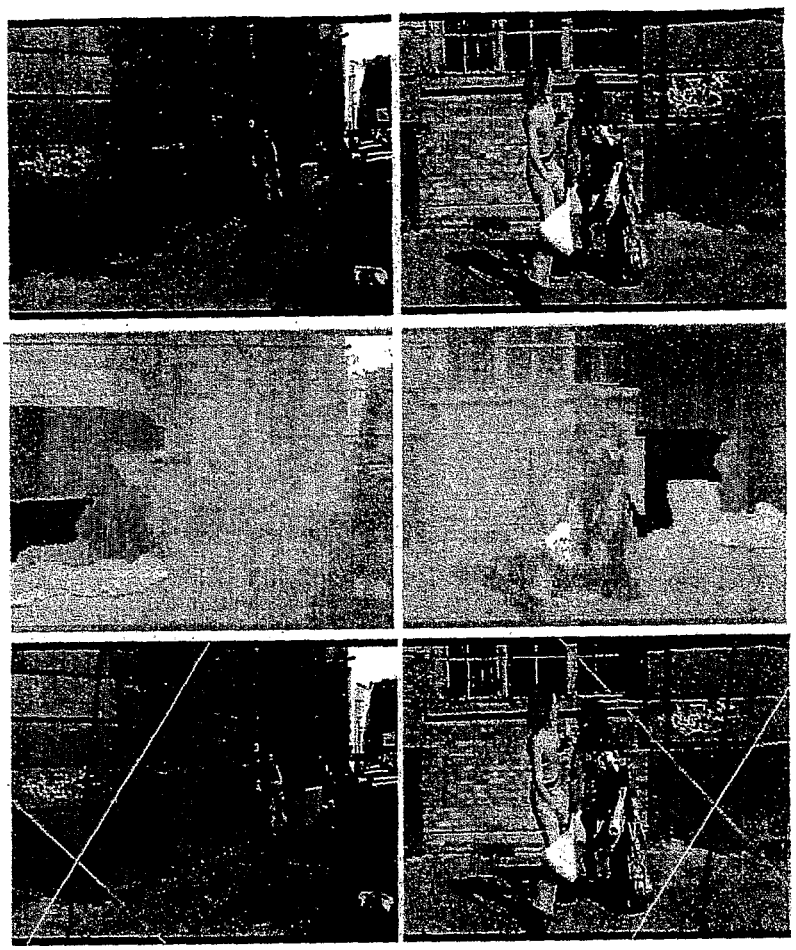
Figure 11 Original images: "Lola5" "Lola6" (top), matched aggregates in scale 9 (middle), and epipolar lines (bottom).

Figure 12: Original images: "Lola7", "Lola8" (top), matched aggregates in scale 9 (middle), and epipolar lines (bottom).

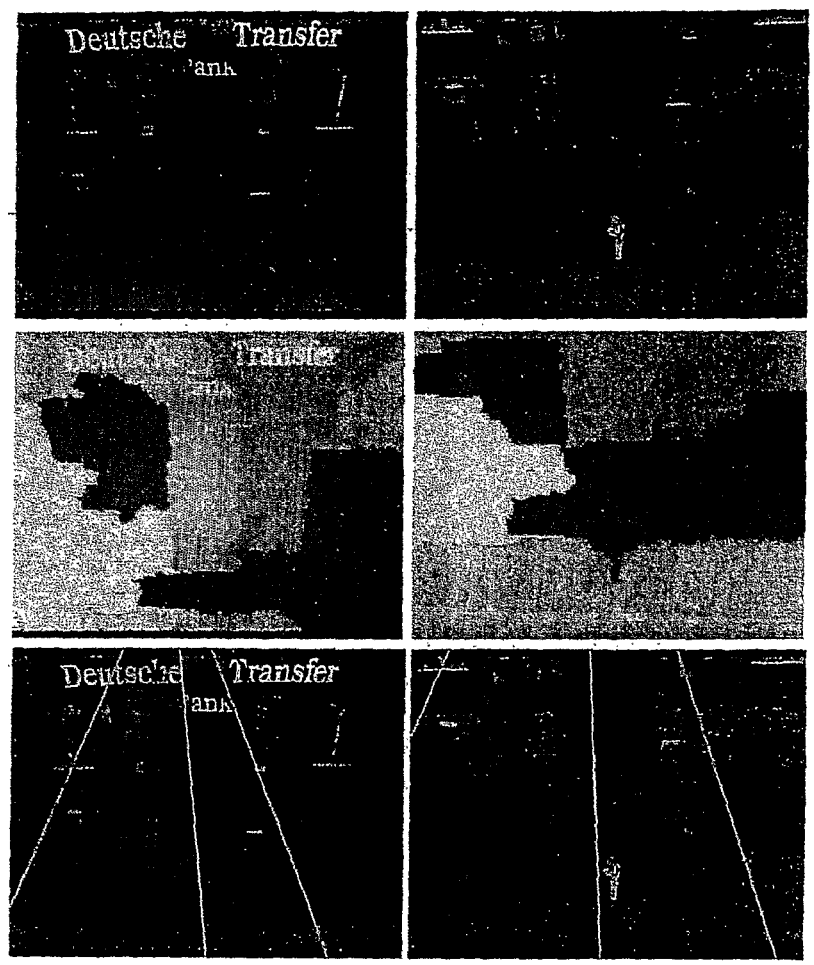
Figure 13: Original images: "Lola9", "Lola10" (top), matched aggregates in scale 10 (middle), and epipolar lines (bottom).

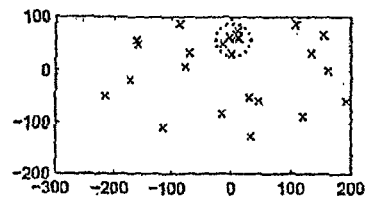
Figure 14: Disparity map of all matches found. Those of the correct matches form a compact cluster (marked by the dotted circle).
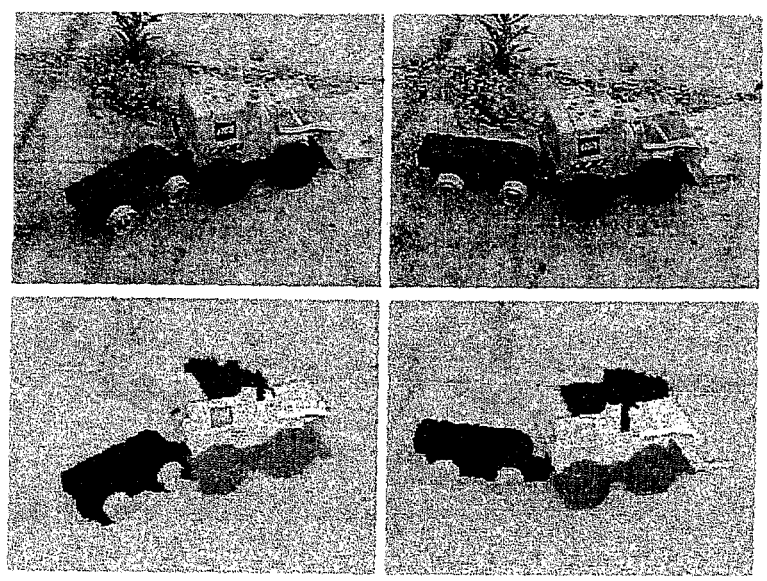
Figure 15: Original images (top) and matched aggregates (bottom).

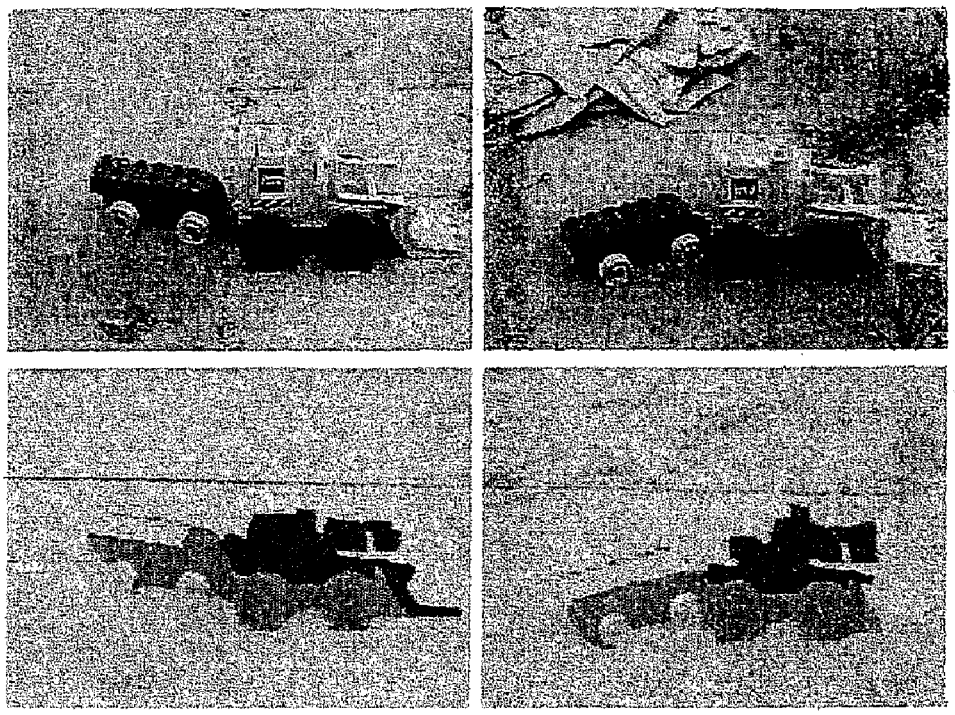
Figure .16: Original images (top) and matched aggregates (bottom).
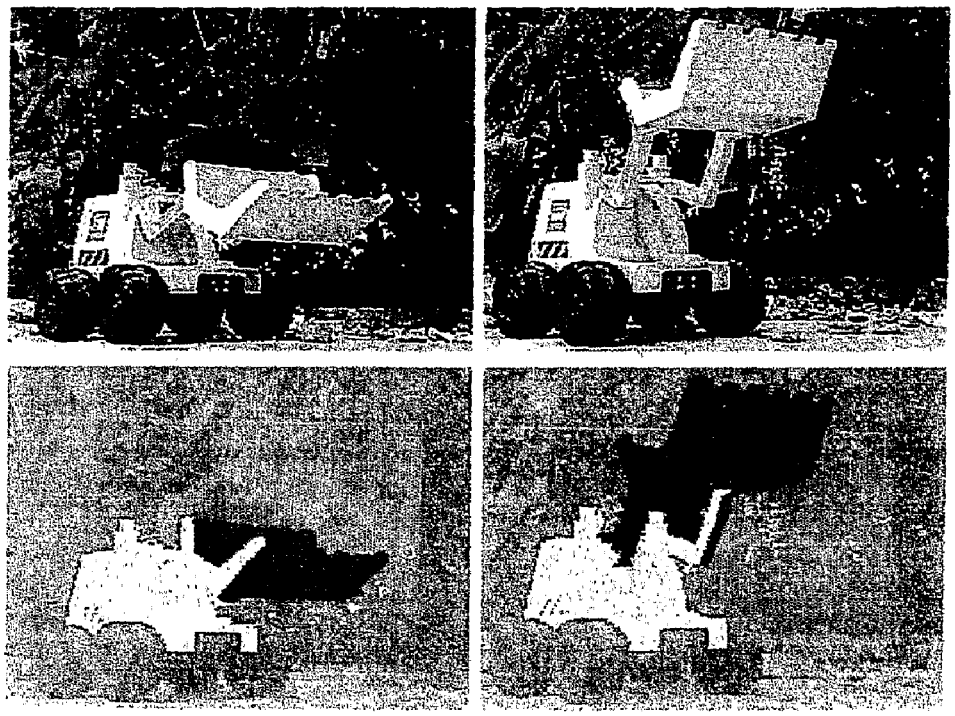
Figure 17: Original images (top) and matched aggregates (bottom).

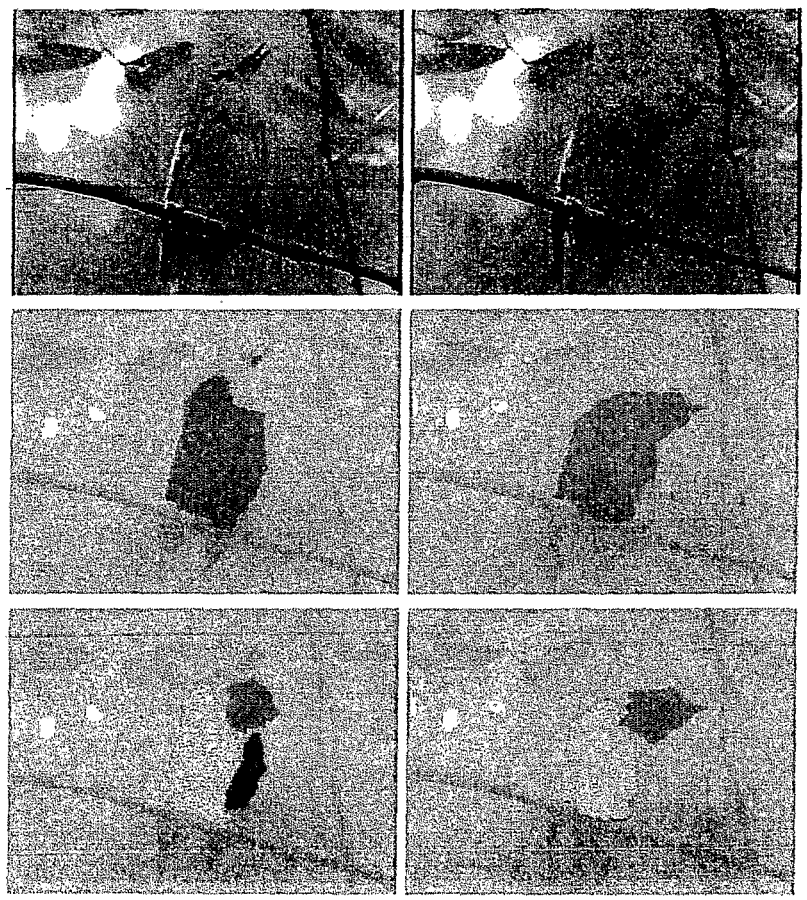
Figure 18: Original images (top), matched aggregates in scale 10 (middle) and in scale 9 (bottom).

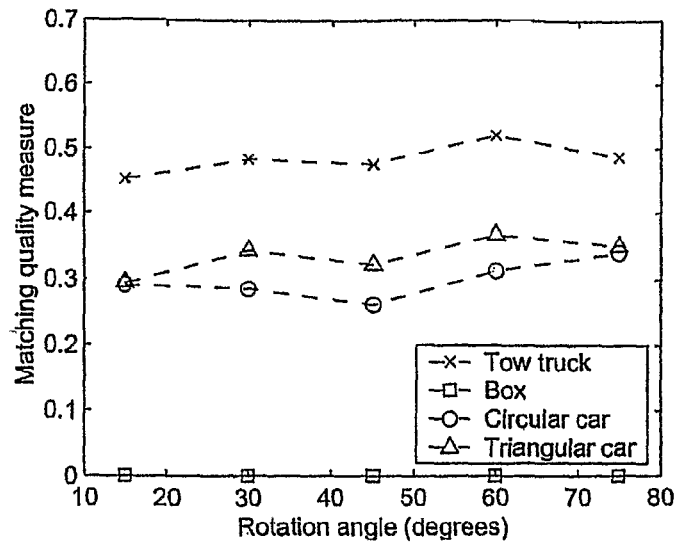
Figure 19: Quality measure for matching the regular car (A) to the other four toys.
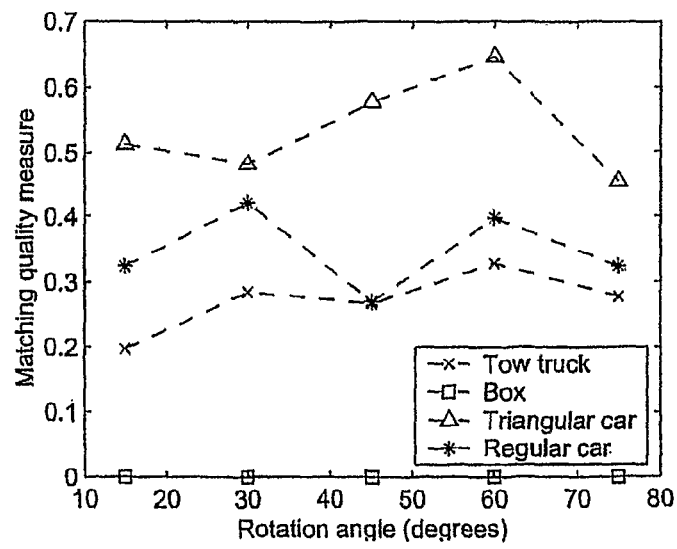
Figure 20: Quality measure for matching the circular car (B) to the other four toys.

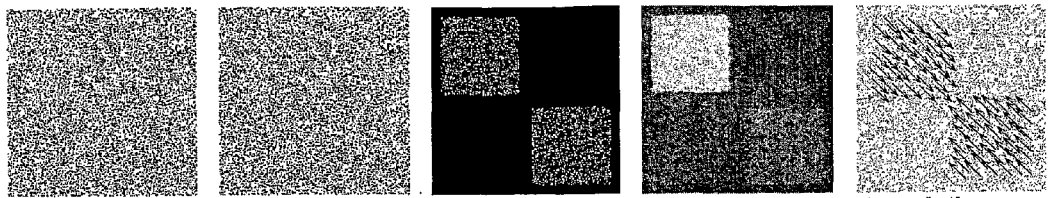
Figure 23: From left to right: a random dot pair containing two translating squares, a difference image, segmentation results obtained with our method, and motion vectors obtained from peaked aggregates at levels 4-5.

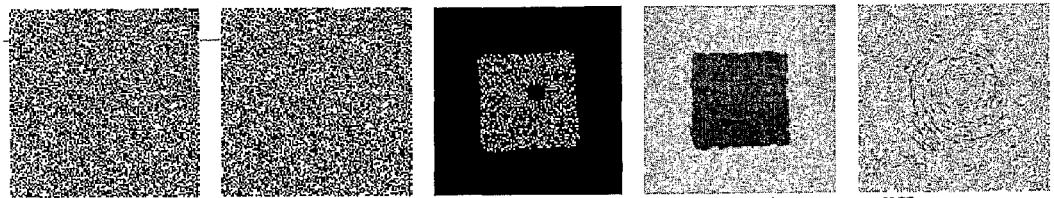
Figure 24: A random dot pair containing a central, rotating square, a difference image, segmentation results obtained with our method, and motion vectors.

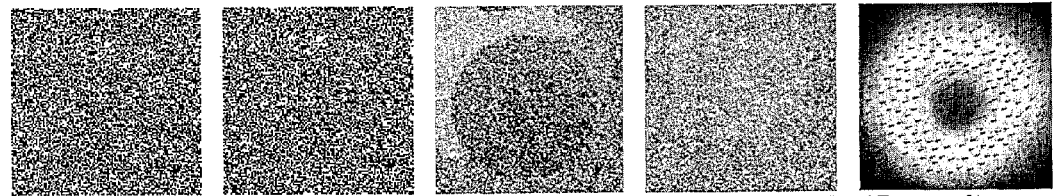
Figure 25: A random dot pair containing two spheres translating in 3D, results obtained by applying our method with affine transformation only, results obtained by applying a comparison of fundamental matrices at the coarsest levels, and motion vectors overlaid on a depth image (intensity proportional to distance from camera).

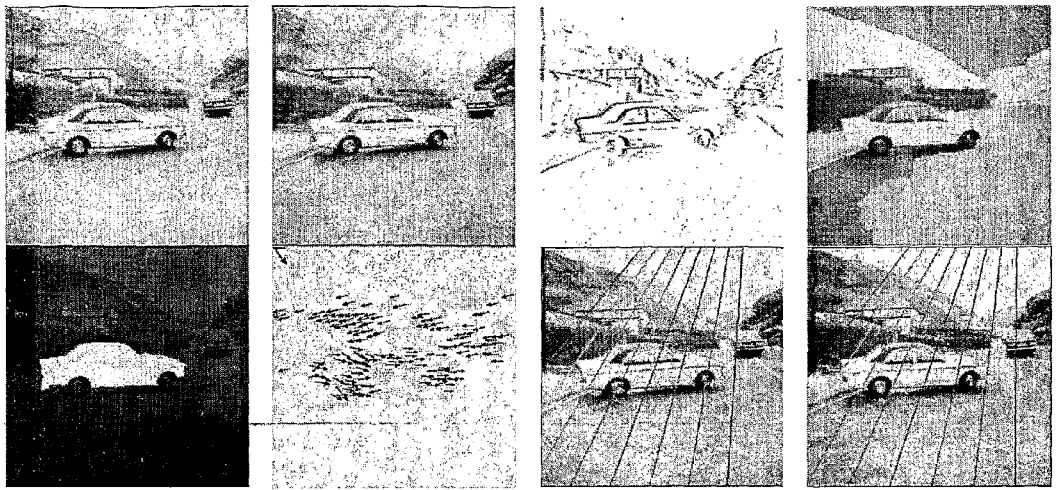

Figure 26: Top row: a motion pair, a difference image, results obtained by applying segmentation based on intensity cues alone. Bottom row: results obtained by applying our method with both motion and intensity cues, motion vectors, and epipolar lines computed for the background segment.

Figure 27: A motion pair, a difference image, results obtained by applying segmentation based on intensity cues alone, results obtained by applying our method with both motion and intensity cues, and motion vectors.

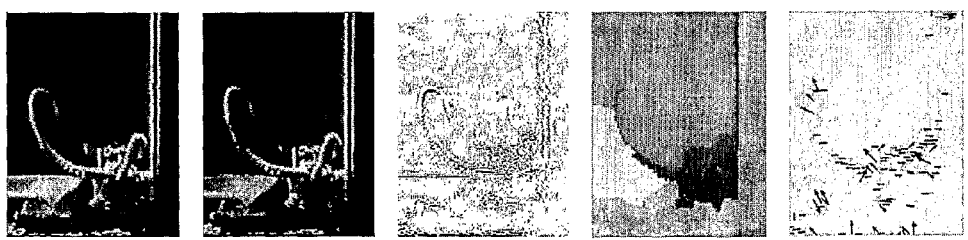

Figure 28: A motion pair, a difference image, results obtained by applying our segmentation method, and motion vectors.

METHOD AND APPARATUS FOR MATCHING PORTIONS OF INPUT IMAGES

CROSS-REFERENCE TO RELATED APPLICATIONS

This application is a national stage application of PCT/US2005/005715, filed Feb. 17, 2005, which claims the benefit of Provisional Application No. 60/545,709, filed Feb. 17, 2004 and Provisional Application No. 60/635,397, filed Dec. 10, 2004.

BACKGROUND OF THE INVENTION

1. Field of the Invention

The invention relates to a method and apparatus for matching portions of input images, and more particularly, to a method and apparatus that generates hierarchical graphs of aggregates to find matching between portions of images. The invention further relates to a method and apparatus for multiscale segmentation that combines motion and intensity cues.

2. Prior Art

Finding the correspondence between portions of input images is important for many vision tasks, such as, motion estimation, shape recovery, and object recognition. Matching two images is particularly difficult when the baseline between the camera centers of the images is wide.

Segmentation of objects based on their motion is perceptually striking, as is exemplified by motion sequences containing random dots. Finding satisfactory algorithmic solutions to this problem, however, has remained a challenge. Algorithmic approaches to motion segmentation seem to face both the difficulties that complicate the task of intensity-based segmentation along with the challenges that make motion estimation hard. Issues that complicate segmentation include devising an appropriate measure of similarity and rules of clustering to correctly separate the various segments. Similarly, difficulties in motion estimation are due to the sparseness of motion cues, particularly their absence in uniform regions and due to the aperture problem. Furthermore, of crucial importance is the selection of an appropriate motion model.

A number of effective algorithms have been proposed to address the problem of motion segmentation, many of which produce convincing results on quite complex motion sequences. These algorithms differ in the kind of information they use (sparse features versus dense intensity information) and the motion model they impose (2D parametric versus motion in 3D). Some of these approaches also recognize the importance of combining optical flow measurements with intensity information to solve the problem of motion segmentation.

Motion segmentation approaches that use dense intensity information largely impose 2D parametric motion models (mostly translation or affine). These include layered representations [44,46] (see also [27], [26,45] attempt to relax some of the main requirements of layered approaches), variational methods [30,28], graph-cuts algorithms [31,37,40], and sequential dominant motion removal [38]. Handling 3D motion is usually achieved by extracting and tracking a sparse set of features. Among these are subspace methods, which are restricted to orthographic projection [29,33,36,45] ([47] attempt to apply these methods directly to intensities). Other feature-based methods deal also with perspective projection [41,42].

SUMMARY OF THE INVENTION

The invention provides two systems for matching pairs of input images. In the first system, a system is provided for matching image pairs separated by a wide baseline. First, a multiscale segmentation process is applied to the two images producing hierarchical graphs of aggregates. The two graphs are then compared by finding a maximally weighted subgraph isomorphism. This is done using a variant of an algorithm due to Chung [2], which finds a subtree homeomorphism in time complexity of $O(k^{2.5})$, where k is the number of segments in the images. Results of applying the modified algorithm to real images separated by a wide baseline are presented.

This aspect of the invention provides a system for computing a match between regions in pairs of 2D images and demonstrates its use when the images are separated by a wide baseline. Finding the correspondence between image portions is important for many vision tasks such as stereo, motion, and recognition. In general, the correspondence task, which usually involves matching pixels or feature points, is difficult because it involves a combinatorial search. In stereo and motion applications this combinatorial search is commonly reduced by limiting corresponding points to lie along epipolar lines or by assuming a small motion between frames. In recognition applications these assumptions generally are not valid because (1) epipolar constraints are not known in advance, (2) there may be a large motion between a model and an image ("wide baseline"), and (3) objects may be non-rigid, or one may want to compare images of two different instances of the same perceptual category. This invention includes a technique for comparing images of objects when the change in their appearance is quite dramatic. Under these conditions the apparent shape of the object or its parts may alter substantially. The relative position of parts may change, and different portions of the object may become occluded.

Consequently, metric properties of the images may poorly indicate the similarity between them. Nevertheless, for a large range of changes in viewing direction and deformations certain properties of the regions of an image may be preserved. By noticing these commonalties it is possible to produce useful correspondences between the images.

The method begins by constructing hierarchical graphs of aggregates from the input images. These graphs are computed using [20, 21] Segmentation by Weighted Aggregation algorithm. The algorithm constructs a full multiscale pyramidal representation of the images that highlights segments of interest. This irregular pyramid provides a dense representation of the images, so every level can be approximated from a coarser level using interpolation. Correspondences are then sought between nodes in the two pyramids that are consistent across scale. To this end, directed a-cyclic graphs are constructed from the pyramids and apply a maximally weighted subgraph isomorphism to find a match between the graphs. The method uses a variation of an algorithm for computing a subtree isomorphism due to Chung [2]. The algorithm is quite efficient. The pyramid construction is done in time O(n), where n denotes the number of pixels in the image. The matching is done in time $O(k^{2.5})$, where k denotes the number of aggregates in the graph. In the implementation, the pyramids are trimmed to eliminate the very small aggregates, leaving about a thousand aggregates for each image. The algorithm is demonstrated by applying it to pairs of real images separated by a wide baseline. The results indicate that indeed preserving hierarchy is often sufficient to obtain quite accurate matches.

The challenge of wide baseline matching have been approached by extracting invariants in both images. To overcome occlusion local invariants are used either around a distinct feature point [6, 10, 13, 18, 24] or inside a small region [1, 15, 25]. While these approaches often yield excellent results, they suffer from two shortcomings. First, they rely on identifying pairs of interest points in the images that are projections of the same 3D scene points. This may be problematic when the object has smooth curved surfaces. Secondly, they require that the regions used for extracting the invariants be planar.

Other approaches [3, 9, 11, 12, 19, 23] match segments extracted from both images. Unlike these approaches hierarchical information regarding the relationship between segments is used by this method. This increases the robustness of the matching since not only a segment to a segment are being compared, but also all their subgraphs beneath. In a related approach [4] scale tree decompositions of objects is described. However, this study uses a heuristic network to find a solution to a subgraph isomorphism problem (which is NP complete). In contrast, the invention uses an efficient subtree isomorphism procedure to match the two images. In addition, the graphs matched, which include hierarchical representations of aggregates of pixels with soft relations, are fairly robust to differences between images separated by wide baseline. The problem of tree matching was addressed also in [14], who convert the problem to one of finding the maximal clique in a graph. This work uses an approximation algorithm to solve this NP-complete problem. Finally, [22] match directed acyclic graphs by converting the problem to a maximum weighted bipartite graph matching where the weight of matching two nodes is determined by the subgraphs underneath the nodes. This approach may lead to a match that is inconsistent with the hierarchical structure of the original graphs and may be sensitive to occlusion.

In the second system of the invention, referred hereinafter as the second version, the novel method and apparatus for segmentation is modified by motion providing strong cues. This second version of the invention presents a multiscale method for motion segmentation. The method begins with local, ambiguous optical flow measurements. It uses a process of aggregation to resolve the ambiguities and reach reliable estimates of the motion. In addition, as the process of aggregation proceeds and larger aggregates are identified it employs a progressively more complex model to describe the motion. In particular, the method of this version proceeds by recovering translational motion at fine levels, through affine transformation at intermediate levels, to 3D motion (described by a fundamental matrix) at the coarsest levels. Finally, the method is integrated with a segmentation method that uses intensity cues. The utility of the method is further demonstrated on both random dot and real motion sequences.

This version of the invention is directed toward a multiscale scheme that describes and that enables, through the use of hierarchical bottom-up processing, to overcome some of the crucial difficulties in motion segmentation. In particular, the method or scheme combines motion with intensity cues. The method determines the segments adaptively and estimates their motion by varying the motion model according to the amount of statistics that appears in each segment. In particular, the method and apparatus implement three motion models, translation, affine, and 3D rigid motion followed by perspective projection. The method presented is a two-frame approach developed to work with small motions. It uses the weighted aggregation procedure of [39] as a platform for segmentation. Finally, the method is efficient, with linear runtime complexity in the number of pixels. Further the utility of the method is demonstrated through experiments on both random dot and real image pairs.

Accordingly, the object of the present invention is to provide a method and apparatus that can effectively match portions of two images in a more efficacious manner with better results.

BRIEF DESCRIPTION OF THE DRAWINGS

FIG. 1 shows original images separated by a 3D rotation of 45° and 90° (top) and matching results (bottom), displayed in same colors.

FIG. 2 shows original images separated by a 3D rotation of 45° and 60° (top) and matching results (bottom).

FIG. 3 shows original images (top), matched aggregates (middle) and epipolar lines (bottom).

FIG. 4 shows original images (top), matched aggregates (middle) and epipolar lines (bottom).

FIG. 5 shows original images (top), matched aggregates ($2^{nd}$ row), some of the matching aggregates centroids used for RANSAC ($3^{rd}$ row) and epipolar lines (bottom).

FIG. 6 shows original images (top, notice the tripod at the bottom right corner), matched aggregates (middle) and epipolar lines (bottom).

FIG. 7 shows original images (top, notice the tripod at the bottom left corner), matched aggregates (middle) and epipolar lines (bottom).

FIG. 8 shows original images (top), matched aggregates (middle) and epipolar lines (bottom).

FIG. 9 shows original images: "Lola1", "Lola2" (top), matched aggregates in scales 10, 9 and 8 (middle) and epipolar lines (bottom).

FIG. 10 shows original images: "Lola3", "Lola4" (top), matched aggregates in scale 9 using: fundamental matrix ($2^{nd}$ row), soft matching ($3^{rd}$ row), and epipolar lines (bottom).

FIG. 11 shows original images: "Lola5", "Lola6" (top), matched aggregates in scale 9 (middle) and epipolar lines (bottom).

FIG. 12 shows original images: "Lola7", "Lola8" (top), matched aggregates in scale 9 (middle) and epipolar lines (bottom).

FIG. 13 shows original images: "Lola9", "Lola10" (top), matched aggregates in scale 10 (middle) and epipolar lines (bottom).

FIG. 14 shows a disparity map of all matches found. Those of the correct matches form a compact cluster (marked by the dotted circle).

FIG. 15 shows original images (top) and matched aggregates (bottom).

FIG. 16 shows original images (top) and matched aggregates (bottom).

FIG. 17 shows original images (top) and matched aggregates (bottom).

FIG. 18 shows original images (top), matched aggregates in scale 10 (middle) and in sale 9 (bottom).

FIG. 19 shows the quality measure for matching the regular car (A) to the other four toys.

FIG. 20 shows the quality measure for matching the circular car (B) to the other four toys.

FIGS. 23 to 31b relates to the second version of the method and apparatus. FIG. 23 shows from left to right: a random dot pair containing two translating squares, a difference image, segmentation results obtained with our method, and motion vectors obtained from peaked aggregates at levels 4-5.

FIG. 24 shows a random dot pair containing a central, rotating square, a difference image, segmentation results obtained with this version of the method and apparatus, and motion vectors.

FIG. 25 shows a random dot pair containing two spheres translating in 3D, results obtained by applying this version of the invention wherein the method uses affine transformation only, results obtained by applying a comparison of fundamental matrices at the coarsest levels, and motion vectors overlaid on a depth image (intensity proportional to distance from camera).

FIG. 26 shows, top row: a motion pair, a difference image, results obtained by applying segmentation based on intensity cues alone. Bottom row: results obtained by applying this version of the method with both motion and intensity cues, motion vectors, and epipolar lines computed for the background segment.

FIG. 27 shows a motion pair, a difference image, results obtained by applying segmentation based on intensity cues alone, results obtained by applying this version of the method with both motion and intensity cues, and motion vectors.

FIG. 28 shows a motion pair, a difference image, results obtained by applying this version of the segmentation method, and motion vectors.

FIG. 29 shows a high level flowchart of inputting two images and determining one cluster using the method and apparatus of the second version present invention.

FIG. 30 is another flowchart showing the steps in the coarsening process.

FIGS. 31a and 31b show collectively a more detailed flowchart of the process of the second version of the invention, the program is continued via A-A.

DETAILED DESCRIPTION OF PREFERRED EMBODIMENTS OF THE INVENTION

Figure 21:
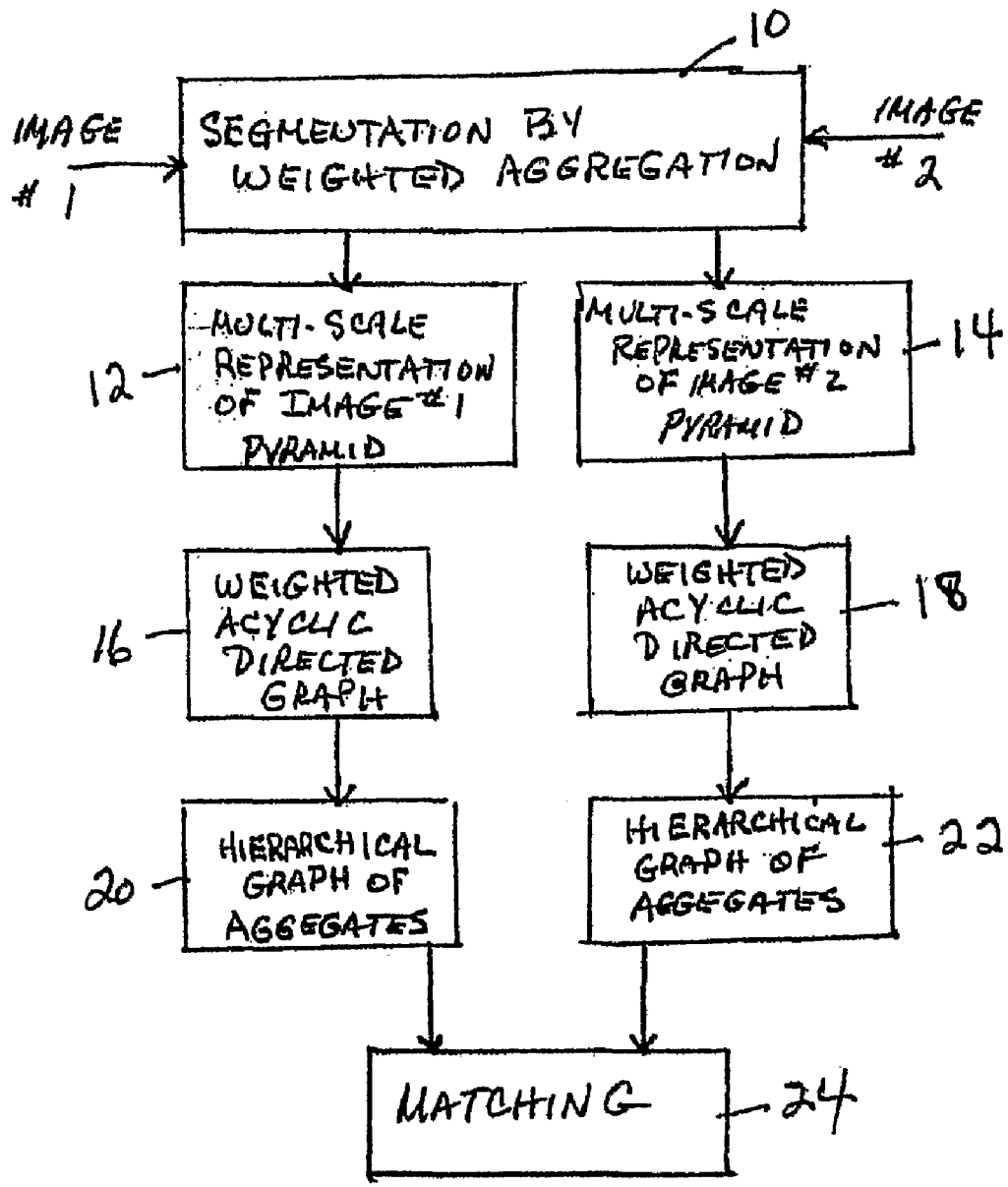
FIG. 21 shows a high level flow chart of the novel method of the present invention.

FIG. 21 shows a high level flow chart of the first version of the method and apparatus of the present invention. The process begins by constructing a hierarchical graph of aggregates for each of the 2D grayscale images separately. This is done by applying the Segmentation by Weighted Aggregation (SWA) algorithm [20, 21] to the images in block 10. Below is a brief outline of the SWA algorithm followed by a description of the inventive input graph.

Segmentation by Weighted Aggregation is an algorithm that uses algebraic multi-grid techniques to find salient segments according to a global energy function that resembles a normalized cuts measure. To find the salient segments the algorithm builds a pyramid of graphs whose nodes represent aggregates of pixels of various size scales, such that each aggregate contain pixels of coherent intensities. The following paragraph summarizes the main steps in the algorithm.

At the finest (=pixel) level a graph is constructed. Each node represents a pixel, and every two neighboring nodes are connected by an edge. A weight is associated with the edge, reflecting the dissimilarities between gray levels of the pixels. This graph is then used by the algorithm to produce a sequence of graphs, such that every new graph constructed is smaller than its predecessor. The process of constructing a (coarse) graph proceeds as follows. Given a (fine) graph the algorithm selects a subset of the nodes to survive to the next level. These nodes are selected in such a way that in the fine graph the rest of the nodes are strongly connected to one or more of the surviving nodes. An edge connects neighboring nodes, and its weight is determined by the weights between the nodes in the finer level. This results in a smaller graph, in which every node represents an aggregate of pixels of roughly similar intensities. Note that in general these aggregates do not yet represent distinct regions since in many cases such aggregates are surrounded by aggregates of similar intensities. Such aggregates represent subregions. As one proceeds higher in the pyramid, neighboring aggregates of similar intensities will merge until at some level they are represented by a single node that is weakly connected to the surrounding nodes. At this point a segment is identified.

In general, every pixel in the image (and, likewise, every node in the graph) may be associated with several aggregates. The degree of association determined by the aggregation procedure is proportional to the relative strength of connection to the pixels in each aggregate. Due to these soft relations the segmentation algorithm can avoid premature local decisions. These soft relations are also important for the matching process. The pyramid constructed by the algorithm provides a multiscale representation of the image as shown in FIG. 21 in blocks 12, 14. This pyramid induces an irregular grid whose points are placed adaptively within segments. The degree of association of a pixel to each of the aggregates in any level are treated as interpolation coefficients and can be used in reconstructing the original image from that level.

A Hierarchical Graph of Aggregates is then obtained in blocks 20, 22 using the resulting pyramid to construct in blocks 16, 18 a weighted acyclic directed graph (DAG) G=(V, E, W) as follows. The nodes V in this graph are the aggregates in the pyramid. The root node represents the entire image. Directed edges connect the nodes at every level of the graph with nodes one level lower. A weight is associated with every edge, reflecting the degree of association between the nodes it connects as is determined by the SWA algorithm. For a parent node I and its child node i this weight is denoted by $w_{iI}$. Note that in this graph a node may have more than one parent. The construction of these weights is done so that $$\sum_{I \in Parents(i)} w_{iI} = 1 \qquad (1)$$

for every node i in the graph (except the root).

In the course of the algorithm the area of aggregates is used to appropriately combine the quality of matches. The area of pixel nodes is defined to be 1. Then, recursively, the area associated with a parent node I is defined as $$A_I = \sum_{i \in Children(I)} w_{iI} A_i. \qquad (2)$$

Note that due to (1) the area sum of all aggregates in every level remains constant.

During the matching stage in block 24, all the aggregates from the pyramid are used, not just those that represent salient segment. This is done in order to keep the area ratio between levels more or less constant and to somewhat reduce the dependence of the algorithm on the peculiarities of the segmentation. For this reason also the inter-level weights are used. Because of complexity issues, however, in the implementation, the few finest levels are trimmed, leaving about a thousand nodes in each graph. As mentioned above, the matching procedure used is quite efficient, $O(k^{2.5})$ where k is the number of aggregates in the graph. The total number of nodes in the pyramid produced by the SWA algorithm is about twice the number of pixels in the image. This number, raised to the 2.5 power, is a bit high, and since the finest aggregates are rarely distinct it is not expected that this trimming has much of an effect on the matching quality.

Regarding matching, after obtaining the two DAGs, a match is found between the aggregates. This problem is cast as a maximally weighted subgraph isomorphism. This formulation allows matching of similar aggregates while constraining the match to adhere to the same hierarchical structure. In addition, in this formulation the cost of the match is optimized, allowing selection of the best match both in terms of the number of aggregates matched and how well they match.

The problem of finding a subgraph isomorphism for general graphs is NP-hard. For trees this problem is polynomial, and efficient algorithms exist. DAGs are more general than trees since nodes may have multiple parent nodes. Nevertheless, these graphs are treated as trees. This issue is further discussed below.

The inventive approach is based on an algorithm by Chung [2] for subtree homeomorphism. The following notation is used. Denote by $T_x$ and $T_y$ the two trees to be matched. Let $\sigma=0; 1, 2, \ldots$ denote a level, where $\sigma=0$ denotes the leaves. Finally, we denote by $x^\sigma_i (1 \leq i \leq N^\sigma_x)$ and $y^\sigma_j (1 \leq j \leq N^\sigma_y)$ nodes in level $\sigma$ of $T_x$ and $T_y$ respectively. The following procedure computes for every node $x^\sigma_i \in T_x$ the isomorphic set of $x^\sigma_i$, denoted $S(x^\sigma_i)$:

1. $S(x^\sigma_i) = \{y^\sigma_j | y^\sigma_j \text{ matches } x^\sigma_i\}$
2. For $\sigma=1, 2, \ldots$
   $S(x^\sigma_i) = \{y^\sigma_j |$ There is a bipartite match between Children $(x^\sigma_i)$ and Children$(y^\sigma_j)\}$.

The largest subtree of $T_y$ that is isomorphic to a subtree of $T_x$ is obtained by selecting the highest level node whose isomorphic set is non empty. The matching induced by this isomorphism is obtained by backtracking from this node downward following the decisions made in the bipartite matching steps. This algorithm runs in time complexity $O(N_x^{1.5} N_y)$, where $N_x = |T_x|$ and $N_y = |T_y|$.

This procedure is modified to obtain a maximal weighted match between the two trees as follows. At the bottom level a match between two pixels $x^\sigma_i$ and $y^\sigma_j$ is assigned a quality measure, for instance, $$Q_{ij} = e^{-\alpha|g_i - g'_j|} \tag{3}$$

where $g_i$ and $g'_j$ denote the gray level values at $x^\sigma_i$ and $y^\sigma_j$ respectively, and $\alpha$ is some constant. We further maintain the area in pixels of every aggregate, which at the pixel level is set to $A_i = A_j = 1$. Quality assignments proceed iteratively as follows. Given all the matches at level $\sigma-1$ the method proceeds to computing the quality of potential matches at level $\sigma$. Let $x^\sigma_i$ and $y^\sigma_j$ denote two nodes at level $\sigma$ of $T_x$ and $T_y$, respectively. Let $M_{IJ}$ denote the set of potential bipartite matches between the children nodes of I and J, the quality of matching $x^\sigma_i$ to $y^\sigma_j$ is defined by $$q^x_{IJ} = \max_{m_{IJ}} \frac{1}{A_I} \sum_{i,j=i(j)} (w_{iI} A_i) Q_{ij} \tag{4}$$

i.e., the quality is set to be the best area-weighted quality sum over the possible bipartite matches of the children nodes of I and J. By weighting the quality by the respective area small matches are prevented from biasing the total quality of the match. This quality measure is denoted with the superscript x ($q^x_{IJ}$) since this measure takes into account only the area of aggregates in $T_x$. Since the matching aggregates in $T_y$ may be of different size, they are symmetrically defined as $$q^y_{IJ} = \max_{m_{IJ}} \frac{1}{A_J} \sum_{j,i=i(j)} (w_{jJ} A_j) Q_{ij} \tag{5}$$

The final quality of match is set to be the minimum of these two measures, $$Q_{IJ} = \min\{q^x_{IJ}, q^y_{IJ}\} \tag{6}$$

This procedure is applied iteratively from bottom to top. At the end the node that achieves the maximal quality is selected and the method backtracks to reveal the match for all nodes.

As mentioned previously, DAGs differ from trees since nodes may have multiple parent nodes. Treating DAGs as trees in this inventive matching procedure may lead to ambiguous matches, in which the same node in one graph may be matched to a different node in the other graph for each of its parents. One remedy for this problem is to first trim the graph to produce a tree (in other words, to maintain one parent for every node). However, this may increase the sensitivity of the algorithm to the segmentation process. This is because quite often a slight change in an image may lead to considering a different parent node as most dominant, even when the change in parent-children weights is not great. Instead, it is preferred to maintain several parents for every node. The way the quality of a match is defined in fact gives rise to a natural interpretation of this case. The weights $w_{il}$ determined by the segmentation procedure can be interpreted as a splitting of aggregates to join their parent aggregates. That is, for an aggregate i of area $A_i$, the term $w_{il} A_i$ is considered to be the sub-area of i that is included in the parent aggregate I (where the rest of its area is divided between its other parents). The bipartite match treats these sub-areas as if they were independent nodes and allows them to match to different (sub-areas of) aggregates. There is no double-counting in this process, so every pixel contributes exactly 1 "unit of match" in every level. Therefore the results are not influenced considerably by this issue (as is confirmed by the experimental results).

Finally, to further allow matchings when the two images (or portions of the images) differ in scale, this procedure is generalized to include the following modifications. First, the matching procedure is initialized by comparing the leaves in one image to all the nodes (at all levels) in the other. Secondly, when an attempt is made to match two nodes, in addition to performing bipartite matching between their children, also considered is matching the children of one node to the grandchildren of the other and vice versa. This allows the method to "skip" a level and thus overcome relative changes in the size of aggregates, which is common under wide baseline conditions. These two modifications do not increase the asymptotic complexity of the algorithm (except for a scaling factor). This is because the number of nodes in the graph is only a constant factor (about double) the number of leaves.

For Wide Baseline Region Matching, the matching algorithm has been implemented and applied to pairs of images of the same scene viewed from different viewing position. Each of the grayscale images taken was resized to 207×276 pixels, and the segmentation algorithm was then applied to obtain its graph of aggregates. A typical graph had 11 levels. The highest level contained a single segment whereas the lowest level contained 57132 segments (=number of pixels). The graphs were trimmed from scale 4 downwards so that the segments of level 5 became the leaves. Their mean size was roughly 25 pixels. The resulting graphs contained about a thousand nodes.

Next, the matching algorithm was run to compute the correspondences. The matching was initialized by matching the leaves in the two graphs and thresholding the difference between their mean gray levels. substituting their mean gray level values into Eq. (3). For the bipartite graph matching an implementation was used by the LEDA package [7].

FIGS. 1 and 2 show a scene that contains a collection of toys. In these experiments the images were taken by rotating the camera around the scene by increments of 15°. After matching the respective graphs, the nodes were picked corresponding to each of the toys in one image and selected from its isomorphic set the node of largest quality x area to be the corresponding node. In the case of the three objects the correct object was always selected (rotations up to 90° were tested), and in the case of the five objects only after rotating the camera by 60° one of the objects did not find the correct match. Note that in these examples the correct matches were chosen among hundreds of candidates. Note also that in both cases the rotation was around an axis in 3D, and so parts of the objects visible in one image became hidden in other images and vice versa.

FIGS. 3-7 show pairs of images of outdoors scenes. In this case after running the matching algorithm, the pair of matched nodes of largest quality x area was selected among the top levels. The matching was then traced downwards to obtain correspondence between aggregates at different scales. The figures show a color overlay of some of the aggregates matched in one scale. Many other matches for aggregates of other various sizes exist in other scales. The correspondences found were then used to compute the fundamental matrix relating the two images.

The centroids of the aggregates (FIG. 5, 3rd row) were picked and used as initial guesses of corresponding points. These correspondences were improved slightly by running the Matlab procedure Cpcorr, which seeks the best correlation within a distance of four pixels. We then used the correspondences found to compute a fundamental matrix using RANSAC (implemented by PVT [16]). An overlay of the epipolar lines on the original images is shown in the bottom of the figures. The accuracy of the fundamental matrix computed can be inferred from the matching epipolar lines. Moreover, the right images in FIGS. 6-7 shows the camera (placed on a tripod) used to take left image. Notice that the epipolar lines in these images intersect almost precisely on the position of the camera. Finally, notice that the objects in FIG. 8 are composed of smooth surfaces and so it is difficult to match them using feature points only.

In another experiment a set of images from different shots of the movie "Run Lola Run" (copyright is reserved to Sony Corporation) was used as a benchmark (FIGS. 9-10). The image pair in FIG. 11 is quite challenging, since only a small portion of the images is common. The algorithm did not succeed to compute a correct match for all the aggregates (second row of FIG. 11). In such a case additional constraints can help discerning the correct match. As an example, it was computed for the best six matches for each aggregate the difference in location between their centroids. Assuming a dominant translational motion, those differences should be similar for the correct matches and randomly distributed for false matches. By identifying a cluster of matches it was possible to identify the correct matches (third row of FIG. 11).

The invention provides a new approach for solving correspondence between regions in images separated by a wide baseline. The method is efficient; its asymptotic time complexity is $O((\# \text{ segments})^{2.5})$. A key characteristic of the approach is the use of aggregates and, moreover, their hierarchical relations which produce a directed acyclic graph structure. The method was demonstrated on images separated by a wide baseline and is suitable for other applications such as object recognition, tracking in video sequences, and more.

Images provide a rich source of information that can be used to construct useful descriptions of the surrounding world. Using images people can, with very little effort, infer the three-dimensional shape of objects, compute their motion, and deduce their identity. Computer vision is a research field whose aim is to develop methods and algorithms that will allow computers to achieve such capabilities.

Particularly, finding the correspondence between portions of input images is important for many computer vision tasks. Matching two images is especially difficult when the images are taken by cameras that are quiet distant from one another. In this application we introduce a system for matching image pairs of the same scene or object. We apply our system both to a scene which is pictured by two cameras that are quite distant from one another (wide baseline stereo), and to an object that is located in different scenes.

The present invention uses image regions which gives a more compact representation than working with pixels. An image region is a group of neighboring pixels that have some property in common (e.g. intensity level). Regions of various sizes are first detected in each image. Next, for each image, both these regions and the hierarchical relations between them are stored in a data structure called a graph. We then seek correspondences between regions, in the two graphs that are consistent across the hierarchy. Corresponding regions are identified assuming the regions roughly maintain some of their basic properties (e.g., their average intensity level) and their relative location in the hierarchy.

The invention includes two variations or embodiments of an algorithm for finding the correspondences between regions. In the first variation we seek a maximal, one-to-one match between regions that preserves the hierarchical structure. In the second variation we modify the algorithm to allow soft matches of one-to-many. We further use the corresponding regions to recover the epipolar constraints that relate the images. The time complexity of these efficient algorithms is $O(k^{2.5})$, where k is the number of regions in the images. Experiments on pairs of images that are quite different are presented.

Images provide a rich source of information that can be used to construct useful descriptions of the surrounding world. A particularly useful source of information is obtained by analyzing the pattern of change between pairs of images. Such pairs can be obtained for example by picturing a scene simultaneously with two cameras (a stereo configuration), a pair of frames in a video sequence, or even a pair of pictures of the same object taken at different times under different viewing conditions. To use the information in such a pair of images we need a method to associate portions in the two images, a problem referred to as the correspondence problem. By correctly matching corresponding portions in the two images we can perform the tasks of surface reconstruction, motion estimation and object recognition.

This invention introduces methods and apparatus for finding the correspondence between portions of two images. The methods will represent the content of the images as hierarchical collections of regions and apply efficient matching techniques in order to find the matching portions. These methods are applied to pairs of images of the same scene or object, but that differ quite substantially. Some of our examples will include image pairs of the same scene taken simultaneously by two cameras that are quite distant from one another, a situation commonly referred to as wide baseline stereo. Other examples will include image pairs of the same object in different scenes.

We first discuss applications that require correspondence between images. The difficulty in finding correspondences is then discussed. Finally, an outline of our inventive approach is provided.

The correspondence problem plays a crucial role in some of the most common tasks with which computer vision is concerned. Assume one wants to recover the geometric structure of a real world object, for example a building. A series of pictures taken around it, can be used to generate a three-dimensional (3D) computer model. Such a model is constructed by first matching features (identifiable patterns that may describe, e.g. corners and lines) in the images and then computing the 3D location of these features by a process known as triangulation.

This 3D model in turn can be used by a real-estate agent to show the building to a client without the need to leave the office. A film producer may use such a model to generate effects, e.g. blowing, that are hard or impossible to generate in real. An engineer may be interested in invoking certain measurements while eliminating the need to get the original plan of the building. Alternatively, it may be used by the municipality to verify that the actual building fits the original approved plan.

An additional application is to recover the different positions of the camera that acquired the images or of moving objects in the scene. Similarly, in an endoscopic operation the 3D position of a needle can be computed. This is done by using the images taken by an imaging system which is attached to the needle. Position may also be useful for a navigation of a robot to avoid a collision with obstacles and for monitoring the robot's movement.

In this additional application one is interested in both the 3D positions of the camera and structure of a scene. The camera calibration is a priori unknown and may change over time. Recovering both the positions of the camera and the structure of the scene is known as structure from motion (SFM). Again, features are matched and used to compute both a 3D model and projection matrices associated with the different cameras.

A third application that involves correspondence is object recognition. For example, a surveillance system may use cameras capturing the area around a house. An object approaching the house should be recognized by the system in order to invoke an appropriate action. If the object is an animal, e.g. a cat, a dog or a bird, it should be ignored. On the other hand, if the object is a person a warning operation should be invoked. Moreover, the system may be requested to identify specific individuals, for example residents. A warning should not be invoked if such a person is approaching the house. In yet another application, a graphic artist may be looking for an image containing a specific scene, say, a child eating an apple. Searching the Internet or another image database can be done by an automatic system. The system in this case should be able to recognize a child, an apple and maybe eating gestures.

In this task one tries to recognize an object in an image and label it, by comparing it to object models that are stored in memory. This is called object recognition. In a preliminary stage of building the object models, a series of images for each object are given. They could be of different viewing directions or illuminations, and even of different instances of the same perceptual category. Matching features across the various images of an object is essential for computing the object model. Next, during the recognition stage, features in an image and the stored models are matched. These matches can be used to compute a transformation that aligns the image and a model, so they can be compared.

Solving for the correspondence between pixels in two images in the most general setting is difficult. In extreme cases shapes which appear in one image are drastically deformed in the other image, due to extreme viewpoint changes or deformation of the objects themselves. Likewise, the intensity and apparent color of objects may change dramatically with a change in lighting conditions. Thus, without further assumptions, each pixel in one image may match any pixel in the other image, leading to an exponential number of feasible matchings. Fortunately, in many practical cases it is possible to constrain this combinatorial search and recover the correspondence efficiently.

Three of the most common assumptions employed to reduce this combinatorial search include (1) invariance of appearance, (2) small motion assumption, and (3) geometric constraints. Many systems that address the correspondence problem assume that some property of pixels remain invariant in the two images. One common example is the so-called constant brightness constraint, which assumes that the intensity of a pixel remains unchanged between the two images. This assumption is valid, e.g., when a stationary scene with lambertian reflectance properties is viewed. Some systems relax this assumption by allowing intensities to scale uniformly. Another example of invariance is in systems that match feature points, i.e., a corner in one image to a corner in another, or an edge pixel to an edge pixel.

Small motion assumption is common in matching consecutive video frames, where it is assumed that the motion between the frames is relatively small. Pyramidal methods are frequently employed to handle motion of several pixels.

Geometric constraints are useful particularly when the viewed scene is static or when an object is moving rigidly. In certain cases the motion between the images can be described simply by a parametric transformation. This is the case when the camera is only rotating around its center or when it views a static planar scene. The images then are related by a 2D projective transformation. In the case that both the camera is translating and the scene is non-planar the images are related by epipolar geometry. A 3D scene point and the two camera centers define a plane, whose intersection with each of the two image planes is a line called epipolar line. If we know the relative location of the two cameras, then for every point in one image we can locate its corresponding epipolar line. However, the position of the corresponding point along this line is unknown since this position depends on the (unknown) depth of the 3D point. Thus, in stereo applications when the scene is rigid the search for correspondences can be reduced to a 1D search.

The above three assumptions are somewhat problematic in the more general case of image matching, when we attempt for example to recognize objects or entire scenes. In such applications (1) epipolar constraints are not known in advance, (2) there may be a large motion between a model and an image ("wide baseline"), and (3) objects may be non rigid, or one may want to compare images of two different instances of the same perceptual category.

This work develops a technique for comparing images of objects when the change in their appearance is quite dramatic. Under these conditions the apparent shape of the object or its parts may alter substantially. The relative position of parts may change, and different portions of the object may become occluded. Consequently, metric properties of the images may poorly indicate the similarity between them. Nevertheless, in many cases there is still ample information that can be used to determine the correct matching. Specifically, an image can be described as a collection of regions (pixels with coherent intensities, color or texture) such that corresponding regions usually contain roughly the same intensities and their relative placement is roughly pre-served. By noticing these commonalities we are able to produce useful correspondences between the images.

The method of the present invention starts by applying a segmentation process to identify regions of coherent intensities in each of the two images. We use a multiscale segmentation algorithm to obtain a hierarchical representation for each image. In this representation every level contains a decomposition of the image into regions of roughly the same size. For each image, these regions (sometimes called aggregates or segments) representation is stored in a data structure called a graph. We then use graph matching techniques to identify the corresponding regions.

A graph G is a pair G=(V; E), where V is a finite set of elements called vertices or nodes, and E is a set of binary relations on V called edges. If E contains a set of ordered relations G is called directed, and if E contains a set of unordered relations G is called undirected. An undirected graph that contains no cycles is called a tree, and a directed graph that contains no cycles is called directed acyclic graph (DAG). In the approach of this invention, each of the two images are represented by a DAG. The nodes in the graph represent the regions identified in the segmentation process. A directed edge connects each aggregate in the graph to each of its sub-aggregates. We then seek a match between aggregates in the two images that is consistent with the hierarchical structure encoded in the graphs. This is achieved by finding an isomorphism between the two graphs.

An isomorphism between two graphs is a one-to-one mapping between their two sets of vertices, such that the relations, defined by the edges of these graphs, are preserved under this mapping. By casting the matching problem as a graph isomorphism we are able to identify corresponding regions, if they roughly maintain some of their basic properties (e.g., their average intensity level) as well as their relative location in the hierarchy.

In general, finding an isomorphism between two graphs is a NP problem, which means that no polynomial-time algorithm has yet been discovered for solution. Therefore the problem is considered intractable. However for trees there exist efficient polynomial algorithms. Our images are represented by DAGs, rather than trees, but their special structure allows us to use a subtree isomorphism algorithm to obtain an approximate match for these graphs.

Two variations of an algorithm for finding the correspondences between regions are introduced. They are based on a tree isomorphism algorithm due to Chung [2]. In the first variation we seek a maximal, one-to-one match between regions that preserves the hierarchical structure. In the second variation we modify the algorithm to allow soft matches of one-to-many in order to account for inconsistencies in the segmentation process.

The algorithm is quite efficient. The pyramid construction is done in time O(n), where n denotes the number of pixels in the image. The matching is done in time $O(k^{2.5})$, where k denotes the number of aggregates in the graph. In our implementation we trimmed the pyramids to eliminate the very small aggregates, leaving about a thousand aggregates for each image. We demonstrate the algorithm by applying it to pairs of real images that are quite different. FIG. 11 shows an example of aggregate matches. The results indicate that indeed preserving hierarchy is often sufficient to obtain accurate matches.

The inventive approach begins by extracting hierarchical graphs of aggregates from the input images. We begin the process by constructing a hierarchical graph of aggregates for each of the 2D grayscale images separately. This is done by first applying the Segmentation by Weighted Aggregation (SWA) algorithm [20, 21] to the images. The SWA algorithm produces for each image a pyramid of aggregates in which every level contains a progressively coarser decomposition of the image into aggregates. For each image, these decompositions are then used to construct a directed acyclic graph that represent the image. The two graphs obtained are later used to match the images.

The segmentation algorithm uses algebraic multigrid techniques to find salient segments according to a global energy function that resembles a normalized cuts measure. To find the salient segments the algorithm builds a pyramid of graphs whose nodes represent aggregates of pixels of various size scales, such that each aggregate contains pixels of coherent intensities. Below we provide a brief outline of the SWA algorithm.

At the finest (=pixel) level a graph is constructed. Each node represents a pixel, and every two neighboring nodes are connected by an edge. A weight is associated with the edge, reflecting the dissimilarities between gray levels of the pixels. This graph is then used by the algorithm to produce a sequence of graphs, such that every new graph constructed is smaller than its predecessor. The process of constructing a (coarse) graph proceeds as follows. Given a (fine) graph the algorithm selects a subset of the nodes to survive to the next level. These nodes are selected in such a way that in the fine graph the rest of the nodes are strongly connected to one or more of the surviving nodes. An edge connects neighboring nodes, and its weight is determined by the weights between the nodes in the finer level. This results in a smaller graph, in which every node represents an aggregate of pixels of roughly similar intensities.

Note that in general these aggregates do not yet represent distinct regions since in many cases such aggregates are surrounded by aggregates of similar intensities. Such aggregates represent subregions. As we proceed higher in the pyramid neighboring aggregates of similar intensities will merge until at some level they are represented by a single node that is weakly connected to the surrounding nodes. At this point a segment is identified. In general, every pixel in the image (and, likewise, every node in the graph) may be associated with several aggregates. The degree of association determined by the aggregation procedure is proportional to the relative strength of connection to the pixels in each aggregate. Due to these soft relations the segmentation algorithm can avoid premature local decisions. These soft relations are also important for the matching process. We shall discuss this issue in more detail in the following. The pyramid constructed by the algorithm provides a multiscale representation of the image. This pyramid induces an irregular grid whose points are placed adaptively within segments. The degree of association of a pixel to each of the aggregates in any level are treated as interpolation coefficients and can be used in reconstructing the original image from that level.

The invention uses the resulting pyramid to construct a weighted acyclic directed graph (DAG)

G=(V; E; W) as follows.

The nodes V in this graph are the aggregates in the pyramid. The root node represents the entire image. Directed edges connect the nodes at every level of the graph with nodes one level lower. A weight is associated with every edge, reflecting the degree of association between the nodes connected by this edge, as is determined by the SWA algorithm. For a parent node I and its child node i we denote this weight by $w_{iI}$. Note that in this graph a node may have more than one parent. The construction of these weights is done so that $$\sum_{l \in Parents(i)} w_{il} = 1 \quad (1)$$

for every node i in the graph (except the root).

In the course of the matching algorithm we will use the area of aggregates to appropriately combine the quality of matches. We define the area of pixel nodes to be 1. Then, recursively, we define the area associated with a parent node l as $$A_l = \sum_{i \in Children(l)} w_{il} A_i. \quad (2)$$

Note that the area sum of all aggregates in every level remains constant.

During the matching stage we will use all the aggregates from the pyramid, not just those that represent the salient segments. We do so in order to keep the area ratio between levels more or less constant and to somewhat reduce the dependence of the algorithm on the peculiarities of the segmentation. For this reason it is also helpful that the inter-level weights are fuzzy and not deterministic. Because of complexity issues, however, in our implementation we trim the few finest levels, leaving about a thousand nodes in each graph. As we mentioned in the introduction, the matching procedure that we use is quite efficient, $O(k^{2.5})$ where k is the number of aggregates in the graph. The total number of nodes in the pyramid produced by the SWA algorithm is about twice the number of pixels in the image. This number, raised to the 2.5 power, is a bit high, and since the finest aggregates are rarely distinct we do not expect this trimming to have much of an effect on the matching quality.

After obtaining the two DAGs, we turn to finding a match between the aggregates. We cast this problem as a maximally weighted subgraph isomorphism. This formulation allows us to match similar aggregates while constraining the match to adhere to the same hierarchical structure. In addition, in this formulation the cost of the match is optimized, allowing us to select the best match both in terms of the number of aggregates matched and how well they match.

The problem of finding a subgraph isomorphism for general graphs is NP-complete. For trees this problem is polynomial, and efficient algorithms exist. DAGs are more general than trees since nodes may have multiple parent nodes. Nevertheless, we will treat these graphs as trees. This issue is further discussed below. Our approach is based on an algorithm by Chung [2] for subtree homeomorphism. We use the following notation. Denote by $T_x$ and $T_y$ the two trees to be matched.

Let

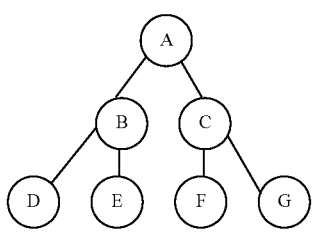

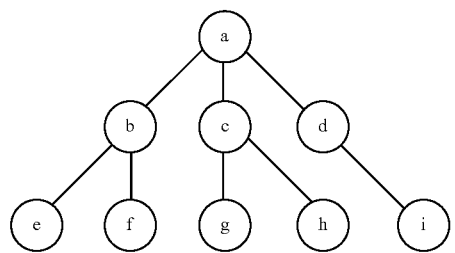

Diagram 1: Two examples of trees.

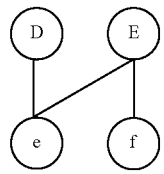

Diagram 2: Consider the trees in Diagram 1. Suppose the leaves are matched and $s_D=\{e\}$ and $s_E=\{e,f,g\}$. This diagram shows the bipartite graph for the descendants of B and b. $\sigma=0, 1, 2, \ldots$ denote a level, where $\sigma=0$ denotes the leaves. Finally, we denote by $x_i^\sigma$ ($1 \leq i \leq N_x^\sigma$) and $y_j^\sigma$ ($1 \leq j \leq N_y^\sigma$) nodes in level $\sigma$ of $T_x$ and $T_y$, respectively. The following procedure computes for every node $x_i^\sigma \in T_x$ the isomorphic set of $x_i^\sigma$, denoted $S(x_i^\sigma)$:

1. $S(x_i^0) = \{y_j^0 | y_j^0 \text{ matches } x_i^0\}$
2. For $o=1, 2 \ldots$ $S(x_i^\sigma) = \{y_j^\sigma | \text{ There is a bipartite match between Children} (x_i^\sigma) \text{ and Children}(y_j^\sigma)\}$.

For example, consider the two example trees shown in Diagram 1. Assuming each of the leaves in $t_1$ is matched to all leaves in $t_2$, one can write for the node B: $S(B)=\{b, c\}$. The largest subtree of $T_y$ that is isomorphic to a subtree of $T_x$ is obtained by selecting the highest level node whose isomorphic set is non empty. The matching induced by this isomorphism is obtained by backtracking from this node downward following the decisions made in the bipartite matching steps. This algorithm runs in time complexity $O(N_x^{1.5} N_y)$, where $N_x=|T_x|$ and $N_y=|T_y|$.

We modify this procedure to obtain a maximal weighted match between the two trees as follows. At the bottom level a match between two pixels $x_i^0$ and $y_j^0$ is assigned a quality measure $Q_{ij}$, for instance, $$Q_{ij} = e^{-\alpha |g_i - g'_j|} \quad (3)$$

where $g_i$ and $g'_j$ denote the gray level values at $x_i^0$ and $y_j^0$ respectively, and $\alpha$ is some constant (e.g., $\alpha=5$). We further maintain the area in pixels of every aggregate, which at the pixel level is set to $A_i=A_j=1$. Quality assignments proceed iteratively as follows. Given all the matches at level $\sigma-1$ we proceed to computing the quality of potential matches at level $\sigma$. Let $x_i^\sigma$ and $y_j^\sigma$ denote two nodes at level $\sigma$ of $T_x$ and $T_y$, respectively. The area associated with these aggregates is given by $$A_I = \sum_{i \in Children(I)} w_{iI} A_I, \quad (2)$$

where $w_{iI}$ are the inter-level weights determined by the segmentation process. Let $M_{IJ}$ denote the set of potential bipartite matches between the children nodes of I and J, we define the quality of matching $x_i^\sigma$ to $y_j^\sigma$ by $$q_{IJ}^x = \max_{m_{IJ}} \frac{1}{A_I} \sum_{i,j=i(j)} (w_{iI} A_i) Q_{ij}. \quad (4)$$

i.e., the quality is set to be the best area-weighted quality sum over the possible bipartite
matches of the children nodes of I and J. By weighting the quality by the respective area we prevent small matches from biasing the total quality of the match.

We denote the quality measure with the superscript x ($q_{IJ}^x$) since this measure takes into account only the area of aggregates in $T_x$. Since the matching aggregates in $T_y$ may be of different size we symmetrically define $$q_{IJ}^y = \max_{m_{IJ}} \frac{1}{A_J} \sum_{j,i=i(j)} (w_{jJ} A_j) Q_{ij}. \quad (5)$$

The final quality of match is set to be the minimum of the two measures (with respect to the two images), $$Q_{IJ} = \min\{q_{IJ}^x, q_{IJ}^y\} \quad (6)$$

This is done to make sure that a good score is obtained only when the match is relatively optimal with respect to both aggregates (belonging to the two images) considered.

As an alternative we also experimented with a normalized version of the matching quality measure. Based on Eq. 5 we define $$q_{IJ}^{\prime x} = \frac{1}{\max_p q_{Ip}^x} q_{IJ}^x, \quad (7)$$

and similarly for Eq. 8. The final quality of a match is then defined as $$Q_{IJ} = \min\{q_{IJ}^{\prime x}, q_{IJ}^{\prime y}\} \quad (6)$$

This procedure is applied iteratively from bottom to top. At the end we select the pair of nodes that achieves the highest quality match and backtrack to reveal the match for all nodes. Once we select a matching pair, we deduce a matching for the descendant aggregates by tracing the graphs downwards following the decisions made by the algorithm. Given a pair of matching parent aggregates their children matches are inferred, according to the maximal bipartite match obtained for the children. The same procedure is then invoked for each of the children, and so on downwards, till matches for all the aggregates are computed. The inference regarding the children matches assigns to each aggregate at most a single matching aggregate. More options are relevant for the soft matching approach and are discussed hereinafter.

As we have mentioned in the beginning of this section, DAGs differ from trees since nodes may have multiple parent nodes. Treating DAGs as trees in our matching procedure may lead to ambiguous matches, in which the same node in one graph may be matched to a different node in the other graph for each of its parents. One remedy for this problem is to first trim the graph to produce a tree (in other words, to maintain one parent for every node). However, this may increase the sensitivity of the algorithm to the segmentation process. This is because quite often a slight change in an image may lead to considering a different parent node as most dominant, even when the change in parent-children weights is not great. Instead, we preferred to maintain several parents for every node. The way we defined the quality of a match in fact gives rise to a natural interpretation of this case. The weights determined by the segmentation procedure can be interpreted as a splitting of aggregates to join their parent aggregates. That is, for an aggregate i of area $A_i$ we consider the term Ai to be the sub-area of i that is included in the parent aggregate I. The rest of the area of i is likewise divided between its other parents. The bipartite match treats these sub-areas as if they were independent nodes and allows them to match to different (sub-areas of) aggregates. There is no double-counting in this process, so every pixel contributes exactly 1 "unit of match" in every level. We therefore do not expect our results to be influenced considerably by this issue (as is confirmed by the experimental results).

Finally, to further allow matchings when the two images (or portions of the images) differ in scale we generalize this procedure to include the following modifications. First, we begin the matching procedure by comparing the leaves in one image to all the nodes (at all levels) in the other. Secondly, when we attempt to match two nodes, in addition to performing bipartite matching between their children we also consider matching the children of one node to the grandchildren of the other and vice versa. This allows us to "skip" a level and thus overcome relative changes in the size of aggregates, which is common under wide baseline conditions. These two modifications do not increase the asymptotic complexity of the algorithm (except for a scaling factor). This is because the number of nodes in the graph is only a constant factor (about double) the number of leaves. It should be noted that allowing skips also does not increase the asymptotic complexity of the algorithm.

The method of the invention, till now, does not impose on a match any spatial consistency with the image. This scheme, in principle, allows two neighbor aggregates in one image to be matched to two non-neighbor aggregates in the other image. This is important for images obtained with wide baseline conditions since under extreme viewpoint differences, different aggregates can be differently displaced. Such different displacements may change the neighbor structure of aggregates. However, in many cases enforcing spatial consistency can eliminate ambiguities in the matching. For example, consider the case of a parent aggregate that is divided into two children aggregates in both images, where the boundaries between the aggregates are determined by the segmentation algorithm in a somewhat arbitrary way. At this level of scale, there is no obvious way to distinguish between the children and to decide how to match them. Here spatial consistency may resolve the ambiguity. Arbitrary segment boundaries can be identified by analyzing the children saliency and observing those which are non-prominent. Utilizing spatial information is demonstrated in this portion.

The matched regions can be used to calculate the fundamental matrix relating the two images. This matrix captures the geometric relation between the images. A point in one image can match only points along its corresponding epipolar line in the other image. Once the fundamental matrix is computed, it can be used to correct erroneous matches. The fundamental matrix is calculated using RANSAC, which ensures the rejection of those erroneous matches. Therefore, the estimated fundamental matrix is fairly accurate, and hence it is appropriate for correcting the erroneous matches.

One way for correcting erroneous matches is to apply a post-processing stage in order to identify region matches that are incompatible with the fundamental matrix. This can be done by a top-down scan of the tree. Every incompatible match identified is replaced with a better match from the computed isomorphic sets. Note that every such replacement modifies all the matches underneath.

An alternative approach is to repeat the entire algorithm, this time using the fundamental matrix already computed. In the second run the measure (8) is modified such that a match that is compatible with the computed fundamental matrix is more favored. Denote the fundamental matrix by F, and by $p_I$; $p_J$ the centroids of two matched aggregates I, J respectively. If $P_I$ and $P_J$ were projections of the same 3D point, then $P_J$ would reside on the epipolar line $l_J = Fp_J$ of $P_J$ in the other image. In practice centroids may not represent the same 3D points, but we can still use their offset from the epipolar line as a rough estimate of compatibility. Denote by $d(l_J; p_I)$ the distance from the point $p_I$ to the epipolar line $l_J$. We call it PEL distance (Point Epipolar Line distance). Then, the compatibility of the pair I; J with the fundamental matrix F is represented by the indicator function:

$$C_{IJ}^F = \begin{cases} 1 & d(l_J, p_I) \leq d_0 \\ 0 & \text{otherwise} \end{cases} \quad (9)$$

where $d_0$ is a threshold (e.g., $d_0=15$). This is used for updating the matching quality measure using the equation:

$$Q'_{IJ} = (1-w)Q_{IJ} + wC_{IJ}^F, \quad (10)$$

where w ($0 \leq w \leq 1$) is some predetermined scalar (in our experiments we used w=0.1).

In relatively difficult cases, i.e. when the images contain relatively little overlap or when the difference between the images is large, it may happen that incorrect matches are scored first. Yet, in such cases the correct matches would still be ranked high. In such cases we may want to use additional properties of the region, such as gray level, color, texture, PEL distance (defined herein) to select the correct match.

Another approach, which was utilized in our experiments, is to use the disparity of the various matches, both correct and incorrect, to infer the correct ones. Given a pair of matching aggregates, I, J, we denote by $p_I$; $p_J$ their centroids respectively. The disparity is then defined as $$\text{disparity}_{IJ} = p_I - p_J. \quad (11)$$

Denote by S the set containing all matches computed, and by $S_c$ its subset which contain only the correct ones. Also, denote by $S_{ic}$ the complementary subset $S - S_c$ that contains the incorrect matches.

The disparities of $S_c$'s elements are nearly identical in the case of a simple camera motion such as translation. Even in the more complicated scenario of a wide baseline, there may exist a few subsets of correct matches with resembling disparities. This is so, since often an aggregate has a few neighbor aggregates that originate from a close position in 3D. Thus, they all have a resembling disparity in the 2D images. Such resembling disparities can be detected by finding one or few compact clusters in the disparity map of S's elements, as illustrated in FIG. 5.14. On the other hand, the disparities of $S_{ic}$'s elements have a random pattern since they are the result of erroneous matches. Thus, they do not form a compact cluster in the disparity map. Such approach can be viewed as a Hough transform in disparity space.

Till now we introduced the algorithm for computing a one-to-one match between regions in images. Next, we move to describing the soft matching algorithm.

In the course of constructing the pyramids of aggregates there is some degree of arbitrariness, which is not accounted for by the matching algorithm outlined above. The pyramid is built level by level, where at every level larger lumps of pixels join to form aggregates. Some of these aggregates are salient, representing a segment in the image, but many of the aggregates are non-salient representing parts of yet-to-be-formed segments. Consider now a neighboring pair of aggregates that are part of the same segment. The location of the boundaries between such aggregates is somewhat arbitrarily determined by the algorithm, according to the exact distribution of gray levels near those boundaries. This may lead to some variation in the size of non-salient aggregates in different images, and in some cases even to a variation in the number of aggregates from which a salient segment is composed.

Suppose now that an aggregate i in one image should be matched to an aggregate j in the other. Because of this arbitrariness it may be that j is somewhat smaller than i. The total area counted toward the match then would be underestimated. This problem would be worsen if, for example, we need to match a set of three aggregates in one image to a set of four aggregates in the other, in which case one aggregate will be left unmatched. One possible solution to this problem is to allow multiple, soft matches. Such an algorithm is described below.

The basic idea behind this algorithm is that in assessing the quality of a matching pair of aggregates we will allow all their children to match simultaneously. But we will have to ensure that no pixel is counted more than once. To achieve this we will maintain for every pair of nodes i and j both the quality of match $Q_{ij}$ and the area of match $a_{ij}$. At the pixel level we will define $Q_{ij}$ as before (Eq. 3.3). Given all the matches at level $\sigma-1$, we compute the quality of potential matches at level $\sigma$ as follows.

$$\tilde{Q}_{IJ} = \max_{b_{ij}} \frac{1}{A_I} \sum_i \sum_j b_{ij} Q_{ij} \quad (12)$$

where $b_{ij}$ are subject to the following three constraints:

$$0 \leq b_{ij} \leq a_{ij}$$

$$\Sigma_j b_{ij} \leq w_{iI} A_i \quad (13)$$

$$\Sigma_i b_{ij} \leq w_{jJ} A_j$$

These constraints guarantee that we do not match more area than was matched at the previous level, and that we do not exceed the total area of the matched aggregates. We further define the area of match using the values of $b^*_{ij}$ that maximize (12):

$$a_{IJ} = \sum_i \sum_j b^*_{ij}. \quad (14)$$

Both the objective function (12) and the constraints (13) are linear in their variables, and so the problem can be solved with linear programming. Alternatively, this problem can be cast as a flow problem in a graph where a maximal flow of maximal cost is sought. The network for this problem is composed of a bipartite graph connecting nodes representing the children of I with nodes representing the children of J with capacity $Q_{ij}$. A source node s (associated with I) is connected to every children i of I with capacity $w_{iI}A_i$, and a target node t (associated with J) is connected to every children j of J with capacity $w_{jJ}A_j$. We seek a maximal flow from s to t, where the capacities take care of the constraints (13), and maximizing the cost achieves the objective function (12).

A slightly simpler variation of this approach is to cast the problem in a maximal flow formulation. In this variation there is no distinction between the area of match and the quality of the matched area. The optimization function then becomes:

$$\tilde{Q}_{IJ} = \max_{b_{ij}} \frac{1}{A_I} \sum_i \sum_j b_{ij}, \qquad (15)$$

where $b_{ij}$ are subject to the following three constraints:

$$0 \le b_{ij} \le Q_{ij}A_i$$

$$\Sigma_j b_{ij} \le w_{iI}A_i \qquad (16)$$

$$\Sigma_i b_{ij} \le w_{jJ}A_j$$

With either of those flow solutions, we turn the matching algorithm described in the previous discussion to one that allows multiple soft matches, by replacing the bipartite matching step with a flow formulation. But there is one additional step that has to be implemented or else the algorithm would face a crucial problem. Since the children nodes of every matching pair are allowed to match simultaneously, it may happen that many sparse, fragmented matches from the entire image will accumulate to form an undesired match whose evaluated quality is high. To prevent this we can filter the matches at every level to ensure that only matches that involve considerable portions of the areas of aggregates survive to the next level. This can be done by setting $$Q_{IJ} = f(\tilde{Q}_{IJ}), \qquad (17)$$

where f(.) may be, e.g., a sigmoid function as described.

In the final stage of the matching algorithm, after computing the isomorphic sets, correct matches are revealed. This is done by backtracking similarly to the description given previously. However, the inference regarding the children matches has here additional options. One can assign to each aggregate at most a single matching aggregate similarly to the basic approach. Another option is to allow multiple matches for a child aggregate. In a similar manner, one can allow at most $i_{top}$ (e.g., $i_{top}=2$) matches for an aggregate. It is pointed that such a decision may be non-symmetric, e.g., J is in the top $i_{top}$ matches of I, but not vice versa.

Note that if we choose to allow multiple matches, we may want to eliminate the least significant matches and/or combine those aggregates to identify the area of match, for purposes of visualization or further use.

To summarize, we begin by matching the leaves. Then, proceeding through all the levels from bottom to top, for every two nodes we form a match between their children nodes by finding a flow, and then pass the quality value obtained through a filtering function. After matching the nodes at all levels we select the largest match of high quality and backtrack to recover all the matches based on the decisions made by the flow algorithm.

Eq. 17 can be implemented in several ways. One option is to filter out any match whose quality is below a certain threshold (e.g., $Q_0=0.5$), $$Q_{IJ} = \begin{cases} 0 & \tilde{Q}_{IJ} \le Q_0 \\ \tilde{Q}_{IJ} & \text{otherwise.} \end{cases} \qquad (18)$$

A continuous version of a threshold can be implemented using a sigmoid function, i.e., $$Q_{IJ} = \frac{1}{1+e^{-a(\tilde{Q}_{IJ}-c)}}. \qquad (19)$$

An alternative approach is to increase the score difference between full and very partial matches. This can be implemented by, i.e.

$$Q_{IJ} = \tilde{Q}_{IJ}^2 \qquad (20)$$

The suppression is increased gradually as $\tilde{Q}_{IJ}$ becomes smaller.

We have implemented our algorithms and tested them experimentally on a variety of real image pairs. Below we show the results of these experiments. We first test our algorithms under wide baseline conditions, and then, we apply our algorithms in the context of object recognition. For Wide Baseline Region Matching, the following shows results obtained by running our algorithms under wide baseline conditions. We start by showing results obtained with the basic approach. Next, we show results obtained by applying the soft matching approach on even more challenging image pairs. We then illustrate the utility of geometric constraints. Finally, we show for comparison results obtained using a different approach, based on corners.

We have implemented the matching algorithm and applied it to pairs of images of the same scene viewed from different viewing positions. Each of the grayscale images was first resized to 207×276 pixels, and the SWA algorithm was applied to obtain its graph of aggregates. A typical graph had 11 levels. The highest level contained a single segment whereas the lowest level contained 57132 segments (=number of pixels). The graphs were trimmed from scale 4 downwards so that the segments of level 5 became the leaves. Their mean size was roughly 25 pixels. The resulting graphs contained about a thousand nodes. Next, the matching algorithm was run to compute the correspondences. The matching was initialized by matching the leaves in the two graphs and thresholding the difference between their mean gray levels. In this process the quality measure was normalized using Eq. 7, to substitute in Eq. 8. For the bipartite graph matching we used an implementation by the LEDA package [7].

FIGS. 1 and 2 show a scene that contains a collection of toys. In these experiments the images were taken by rotating the camera around the scene by increments of 15°. After matching the respective graphs we picked the nodes corresponding to each of the toys in one image and selected from its isomorphic set the node of largest quality x area to be the corresponding node. In the case of the three objects the correct object was always selected (we tested rotations up to 90°), and in the case of the five objects only after rotating the camera by 60° one of the objects did not find the correct match. Note that in these examples the correct matches were chosen among hundreds of candidates. Note also that in both cases the rotation was around an axis in 3D, and so parts of the objects visible in one image became hidden in other images and vice versa.

FIGS. 3-7 show pairs of images of outdoors scenes. In this case after running the matching algorithm we selected among the top levels the pair of matched nodes of largest quality x area. We then traced the matching downwards to obtain correspondence between aggregates at different scales. The figures show a color overlay of some of the aggregates matched in one scale. Many other matches for aggregates of other various sizes exist in other scales.

We then used the correspondences found to compute the fundamental matrix relating the two images. We picked the centroids of the aggregates (FIG. 6, 3rd row) and used them as initial guesses of corresponding points. We improved these correspondences slightly by running the Matlab procedure Cpcorr, which seeks the best correlation within a distance of four pixels. We then used the correspondences found to compute a fundamental matrix using RANSAC (implemented by PVT [16]). An overlay of the epipolar lines on the original images is shown in the bottom of the figures. The accuracy of the fundamental matrix computed can be inferred from the matching epipolar lines. Moreover, the right images in FIGS. 6-7 show the camera (placed on a tripod) used to take the left image. Notice that the epipolar lines in these images intersect almost precisely on the position of the camera. Finally, notice that the objects in FIG. 8 are composed of smooth surfaces and so it is difficult to match them using feature points only.

In another experiment a set of 10 images of the movie "Run Lola Run" (Copyright is reserved to Sony Corp.) was used as a benchmark. This set is composed of 5 pairs, each of which describes a similar 3D scene, such that the two images have some overlap (FIGS. 9-13 top). The images originate from different shots and times. Therefore, differences in illumination and shadows, in addition to viewpoint, do exist. This makes the image pairs quite challenging. For example, in FIG. 11 only a small portion of the images is common.

Each of the original images was first resized to 240×300 pixels, and converted to gray scale. Their aggregate graphs were then computed by the segmentation algorithm [21] using gray level and isotropic texture.

For the first pair the algorithm succeeded to compute a correct match as shown in FIG. 9. For the rest it did not succeed to compute a correct match for all the aggregates. In such cases additional constraints can help discerning the correct match. This is illustrated in another portion hereof. Alternatively, one can use the soft matching approach as demonstrated in the next discussion.

The outcome of the algorithm is that aggregate matches are computed for most of the aggregates in the graph hierarchy. As a consequence, matches are computed for different aggregates of various sizes. These different aggregates capture different entities in the image. It is recalled that aggregates of the same scale have resembling sizes. While, aggregates in a coarser scale are of larger size.

Matching results for aggregates of various scales are shown in FIG. 9. While a single aggregate match is revealed in scale 10 (2nd row), in scale 9 (3rd row) its three children are assigned a match. Besides, an additional match is computed for another aggregate (the lower greenish aggregate) whose parent of scale 10 has no match. In turn, this aggregate results in scale 8 (4th row) with four children aggregates (the four lower aggregates). Their matches reveal a correspondence for yet smaller entities in the image. The result is that a match for most of the important entities which are of various sizes (=scales) is revealed.

The previous discussion introduced the results obtained by running the basic, one-to-one match, approach. It turns out that sometimes it is not enough and the other approach, which allows soft matches, is needed. This approach is described above. As with the previous algorithm, we compared aggregates according to their gray levels. We utilized an exponential distance function (Eq. 3), with $\alpha=5$. A threshold of 0.6 was used to eliminate too distant values. The gray level comparison was invoked only in the initialization stage, i.e., when computing the isomorphic sets for the leaves. In the subsequent stages no explicit properties comparison was done for a pair of aggregates, but only their descendants were matched. The matching quality measure was computed using the maximum flow maximum cost (Eqs. 13, 14) utilizing an implementation by LEDA [Led]. Fragmented matches were filtered out with a threshold $Q_0=0.5$ using Eq. 18. For the top down stage we permitted multiple matches for an aggregate with no restriction on their number, i.e. $i_{top}=\infty$ (using the notation of above).

We tested the algorithm on the "Lola" images mentioned above. The result of applying the soft matching approach to the two pairs, "Lola7,8" and "Lola9,10", is shown in FIGS. 12 and 13. For "Lola7,8", we used a lower threshold ($Q_0=0.3$) for filtering the fragmented matches. The change in appearance between the images is bigger, and therefore the quality obtained for correct matches is lower. The soft matching approach produced multiple matchings, some of which were erroneous. We eliminated those erroneous matchings by enforcing consistent disparities.

In FIGS. 6 and 7 the soft matching approach managed to identify more matching aggregates than the basic approach. In these cases there was no need to enforce consistent disparities.

We now show examples that demonstrate the utility of geometric constraints in identifying the correct matches. We show examples in which consistent disparity and consistency with a fundamental matrix improve the matching results. Finally, we show an example in which a simpler soft matching algorithm is used.

The pair "lola9,10" is difficult to match, because only a small portion of the two images contains the same scene. The soft matching approach thus produces some erroneous matches. This is demonstrated in FIG. 14 for the 10 aggregates of scale 10. If we select the 3 best matches for each aggregate we obtain 24 candidate matches. The disparity of each match is plotted in a disparity map. Then, a compact cluster of disparities is detected which is centered at (3,57). The cluster contains only 6 correct matches for 6 aggregates, while for the other 4 aggregates no correct match is detected. These aggregates represent portions of the scene that fall outside the frame of the other image. This demonstrates another useful outcome of the algorithm. It can be used to detect portions of an image that are missing in the other image.

We aided the matching process by using the fundamental matrix, as described previously. Using a weight $w=0.1$ and $d_0=15$ we repeated the matching process (FIG. 10: 2nd row). This procedure encourages matches that are consistent with the fundamental matrix. Regarding the weight, it is noted that the extreme of using $w=1$ does not solve the problem. Such a value forces the algorithm to ignore the hierarchical information and uses only the geometric constraint. However, the fundamental matrix alone cannot determine a unique match, particularly since do must be large enough to account for the shift of centroids of matching aggregates in the two graphs.

In the soft matching approach, descendants are compared using a maximum flow maximum cost measure. A simpler alternative, which computes only a maximum flow, was also presented above. This approach is slightly more efficient.

We implemented this variation where maximum flow was computed utilizing an implementation by LEDA [7]. Results of applying this method are shown in FIG. 11. This image pair is quite challenging, since only a small portion of the images is common. Erroneous matches were eliminated by enforcing consistent disparity. In each isomorphic set the best six matches were considered ($i_{top}$=6, following the notation above). Elimination of erroneous matches was also necessary when the soft matching algorithm that uses maximum flow maximum cost was used.

To illustrate the challenge posed by the image pairs we used in this discussion, we applied a matching algorithm based on corner detection to a few of these images. Although the algorithm we used was not originally planned to handle image pairs under wide baseline conditions it is still able to match challenging image pairs. In the following experiment we used a system developed by Philip Torr of Microsoft Research in Cambridge, England, called SAM (Structure and Motion) Toolkit for Matlab (Version 1). The system starts by detecting Harris corners in the two images. The corners are then matched by using correlation. At last, a robust process is invoked to compute a fundamental matrix. This process ensures the elimination of outliers and the use of correct matches to compute the matrix.

We tested four image pairs: "Shadowed road" (FIG. 7), "Hayovel" (FIG. 8), "Lola3,4" (FIG. 9) and "Lola9,10" (FIG. 14). Regarding the first two pairs it is noted that their upper half is relatively similar. The "Lola"s have an even larger intersection portion, though "Lola3,4" have an evident change of illumination. We first tested the system on the same lower resolution images that we used in our approach. In this case the SAM system failed for all image pairs.

We then re-ran the system this time using the original high resolution images. The "Lola" images are of size 720×576, and the other images of size 640×480. Moreover, we used a color version of the images except for the "Hayovel". This time the SAM system succeeded in matching the "Shadowed road" but failed on the rest. Next, we cropped portions of an image that are occluded in the other. For "Lola9,10" this indeed enabled the system to find the correct match. The number of false matches has been reduced since points that did not have a match have been already eliminated by the cropping step. In contrast, for "Hayovel" and "Lola 3,4" the system still failed to find the correct match. Note that for "Lola3,4" this cropping procedure was insignificant since the occluded portion is relatively small. Here the main difficulty seems to be due to illumination changes which are not handled properly by the correlation measure.

These experiments demonstrate the difficulty of the matching task. Occlusion and illumination variations lead to too many false matches that the robust procedure cannot overcome. In contrast our method finds a globally optimal match that is tolerant to many variations in the images.

It is worth noting however that several successful corner-based methods were developed recently with the specific aim to handle images separated by wide baseline conditions. Unfortunately, we were unable to test these methods since their code was not available to us. We believe that a comprehensive matching system would benefit from utilizing several different approaches (e.g., corners, regions) exploiting each one's advantages where they work best.

The invention can be used also in the context of object recognition to identify objects in variable backgrounds. In this section we show a few examples. For a comprehensive discussion of various definitions and aspects of recognition, this is available in the prior art. Recognition is perhaps simpler when the same 3D rigid object is to be recognized. Even in this case the appearance of objects may vary due to several sources: viewing position, illumination and object placement in the scene. These may also cause an occlusion. A more difficult case is that of a non-rigid object which has moving parts. The most complicated situation is when we attempt to recognize a different object, which is another instance of the same perceptual category. Here the entire shape may deform and only the approximate shape and sometimes texture and color may be preserved.

The ability of the inventive method to tolerate variability due to some changes in viewing angle is demonstrated earlier in the discussion. The first two experiments involved images containing collections of toys. In these experiments the camera was rotating around the scene. Our algorithm succeeded in one case (FIG. 1) to tolerate a 3D rotation up to 90°. In the other case (FIG. 2) it succeeded up to near 60°±. Variability due to scale can be handled by the comparison of the graph leaves to all nodes in the other graph.

Compensating for some illumination variations is demonstrated in the experiments "Lola3,4", "Lola5,6", which are summarized in FIGS. 11, 12. In both cases the two shots of the same scene were taken at completely different times. This can be seen easily by noticing the difference in the shadows around the images. Despite this change our system succeeded in matching these image pairs.

Another important property for recognition is the ability to deal with occlusion. This may be a result of either a change in viewing position or a change in the placement of objects in the 3D scene. Dealing with occlusion is demonstrated in the two experiments with the toy collections and also in "Lola5,6", "Lola9,10". In the first example, since the rotation was around an axis in 3D, parts of the objects visible in one image became hidden in other images and vice versa. Similarly, in "Lola5,6" only the part of the image around the house corner is common to both images, while the rest of the scene is visible in one of the images and occluded in the other. The experiment "Lola9,10" introduces occlusion due to a change in the placement of objects in the scene. Here the woman, whose position changes from the door to the street, occludes different portions of the scene in the two images.

A more complicated case is that of a non-rigid object with articulated parts. Experiments for such cases are shown in FIGS. 15-18. The soft matching algorithm was used. The setup was similar to the one described above, except that we used a threshold of $Q_0$=0.2 to filter out fragmented matches. In addition, there was no need to eliminate erroneous matchings using disparity. It is obvious that because of the non-rigidity a disparity check is not relevant.

In the warbler bird example (Original images taken from http://www.junglewalk.com.) correct matches were found in scale 10 for the bird, and in scale 9 for both its body and head. Yet, the beak aggregate in the left image did not find a match since its appearance changed too much. Another aggregate, the one colored in pink, found also a match to the head aggregate. This additional body aggregate does not exist in the right image and therefore found other matches. The reason for the additional body aggregate was that not only the head has moved but also the body itself deformed. This is, since the bird was singing and its breath was very rapid.

Finally, our matching algorithm can potentially be used in some cases to match objects of the same perceptual category, assuming these objects have similar appearance. Our algorithm is useful in such cases because it relies on part structure to find a match, and it is fairly robust to partial occlusion. However, the full treatment of matching objects of the same perceptual category may require relying less on intensities, and the utilization of shape and texture features. Below we show a simple illustrative experiment using our current tools. We ran the second toys experiment (FIG. 2) wherein the scene contained five toys: a car (A), a circular car (B), a triangular car (C), a tow truck (D) and a box (E). We used the measures in Eqs. 5 and 6 to substitute in Eq. 7. Moreover, to reduce possible differences between objects only due to color, we replaced the gray level distance with a binary function. The matching quality computed for the car (A) when compared to the other four toys for every angle of rotation is plotted in FIG. 19. The highest measure is obtained when the car (A) is compared to the tow truck (D). Note that their frontal two thirds are the same and only their rear part is different. The next similar objects are the triangular (C) and circular (B) cars. These are somewhat similar to the regular car (A) but obviously less than the tow truck. At last, no matching was found between the car (A) and the box (E).

Likewise, the proximity of the circular car (B) to the other toys is shown in FIG. 20. The most similar object is the triangular car (C). The next similar is the car (A), while the tow truck (D) is a bit less similar. Again, no matching was found between the circular car (B) and the box (E). Such ability may be used for object classification. The proximities computed between different object images may be used to determine the object category.

The invention presents a new approach for solving the correspondence between regions, which is suitable for pairs of images that differ quite substantially. The method is efficient; its asymptotic time complexity is $O(k^{2.5})$, where k is the number of regions in the images. A key characteristic of the approach is the use of aggregates and, moreover, their hierarchical relations which produce a directed acyclic graph structure. Such graphs can be compared efficiently. The method was tested both on scenes which are pictured by two cameras that are quite distant from one another (wide baseline stereo), and on objects that are located in different scenes. In addition, the method is suitable for applications such as tracking changes over time, and more. The method is potentially applicable to object recognition and categorization tasks. Objects of the same category usually share a similar inner structure of parts and subparts. The inventive method handles such objects by matching aggregates according to the similarity of their sub-aggregates. In addition, the algorithm is robust to tolerate certain deformations which enables the algorithm in certain cases to match objects with articulated parts or pairs of objects of the same perceptual category.

The algorithm may be useful in a wide range of computer vision applications such as in medical and geographical applications. For these applications the ability to tolerate deformations and detect occlusion is beneficial. By comparing images taken at different times, the algorithm can be used to find changes that occur over time. In medical applications one may use the algorithm to compare x-ray or MRI images of regions of interest at different times. In geographical applications satellite or aerial images can be used to detect certain changes such as a road constructed, a field ploughed, etc. Finally, for stereo, the algorithm can be applied in conjunction to point-based methods. In certain cases aggregates may supply information for matching that is not available in point features. For example, when objects with smooth curved surfaces or different objects of the same category are compared point features may not suffice to determine the matching but part structure may suffice. A general-purpose matching system may combine various modules for computing a match based on these different approaches. A preprocessing decision may select the optimal module to use based on the input images, type of changes expected or type of scene. Alternatively, one may invoke a few modules in parallel to get a few solutions, and then select the best.

The present invention, both first and second versions, can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 22:
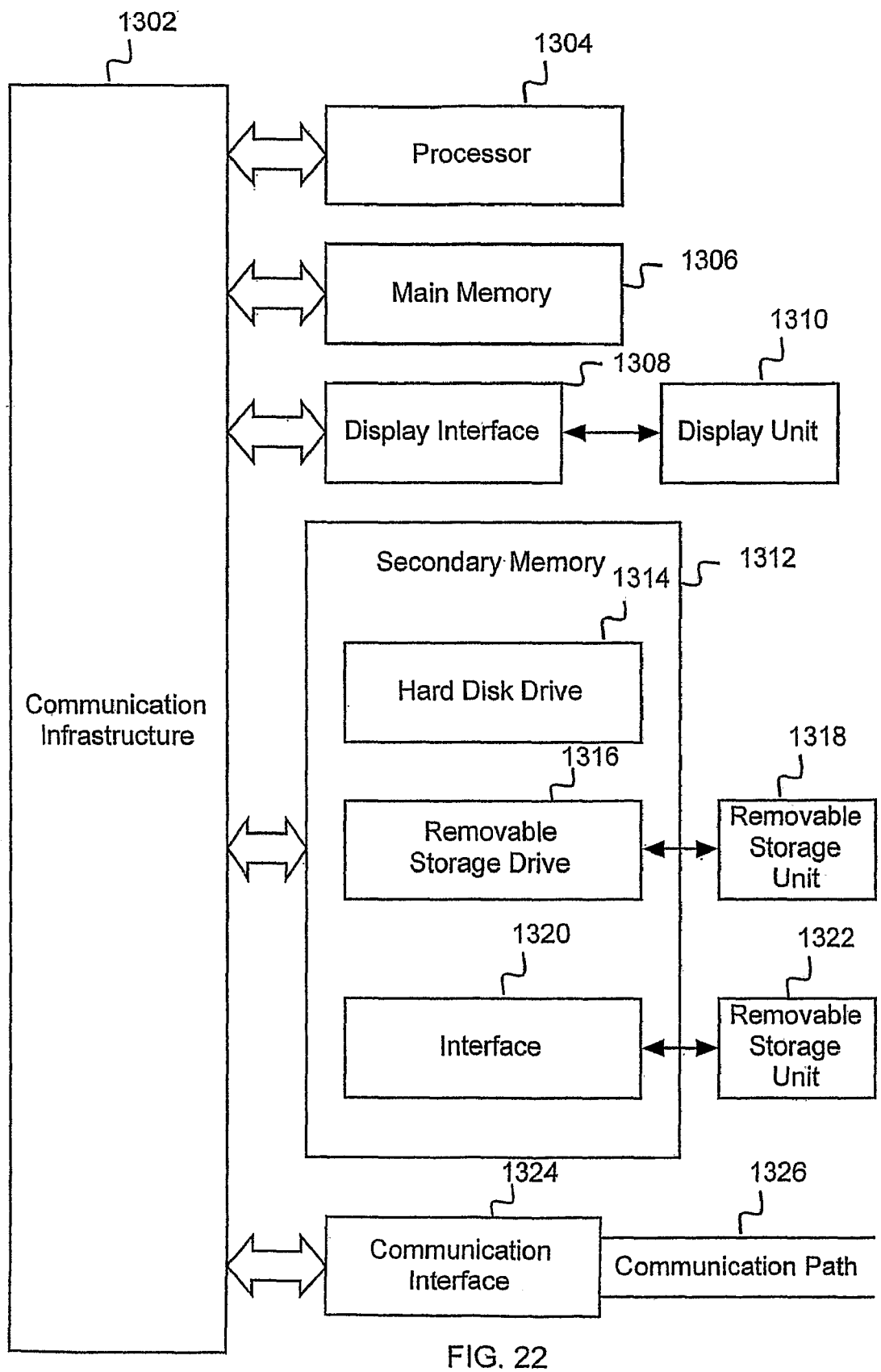
FIG. 22 shows a typical apparatus that can be suitable programmed via software to run the inventive method.

FIG. 22 is a block diagram of a computer system useful for implementing an embodiment of the present invention. The computer system includes one or more processors, such as processor 1304. The processor 1304 is connected to a communication infrastructure 1302 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1308 that forwards graphics, text, and other data from the communication infrastructure 1302 (or from a frame buffer not shown) for display on the display unit 1310. The computer system also includes a main memory 1306, preferably random access memory (RAM), and may also include a secondary memory 1312. The secondary memory 1312 may include, for example, a hard disk drive 1314 and/or a removable storage drive 1316, representing a floppy disk drive, a magnetic tape drive, an optical disk drive, and more. The removable storage drive 1316 reads from and/or writes to a removable storage unit 1318 in a manner well known to those having ordinary skill in the art. Removable storage unit 1318 represents a floppy disk, magnetic tape, optical disk, and more which is read by and written to by removable storage drive 1316. As will be appreciated, the removable storage unit 1318 includes a computer usable storage medium having stored therein computer software and/or data.

In alternative embodiments, the secondary memory 1312 may include other similar means for allowing computer programs or other instructions to be loaded into the computer system. Such means may include, for example, a removable storage unit 1322 and an interface 1320. Examples of such may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to the computer system.

The computer system may also include a communications interface 1324. Communications interface 1324 allows software and data to be transferred between the computer system and external devices. Examples of communications interface 1324 may include a modem, a network interface (such as an Ethernet card), a communications port, a PCMCIA slot and card, and more Software and data transferred via communications interface 1324 are in the form of signals which may be, for example, electronic, electromagnetic, optical, or other signals capable of being received by communications interface 1324. These signals are provided to communications interface 1324 via a communications path (i.e., channel) 1326. This channel 1326 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1306 and secondary memory 1312, removable storage drive 1316, a hard disk installed in hard disk drive 1314, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 1306 and/or secondary memory 1312. Computer programs may also be received via communications interface 1324. Such computer programs, when executed, enable the computer system to perform the features of the present invention as discussed herein. In particular, the computer programs, when executed, enable the processor 1304 to perform the features of the computer system. Accordingly, such computer programs represent controllers of the computer system.

Second System of the Invention (Second Version)
Aggregation of Motion Cues

Referring now to the second version of the method and apparatus of the present invention. In the second version, the novel method and apparatus for segmentation is modified by motion providing strong cues. This second version of the invention presents a multiscale method for motion segmentation. The method begins with local, ambiguous optical flow measurements. It uses a process of aggregation to resolve the ambiguities and reach reliable estimates of the motion. In addition, as the process of aggregation proceeds and larger aggregates are identified it employs a progressively more complex model to describe the motion. In particular, the method of this version proceeds by recovering translational motion at fine levels, through affine transformation at intermediate levels, to 3D motion (described by a fundamental matrix) at the coarsest levels. Finally, the method is integrated with a segmentation method that uses intensity cues. The utility of the method is further demonstrated on both random dot and real motion sequences.

This second version of the invention is directed toward a multiscale scheme that describes and that enables, through the use of hierarchical bottom-up processing, to overcome some of the crucial difficulties in motion segmentation. In particular, the method or scheme combines motion with intensity cues. The method determines the segments adaptively and estimates their motion by varying the motion model according to the amount of statistics that appears in each segment. In particular, the method and apparatus implement three motion models, translation, affine, and 3D rigid motion followed by perspective projection. The method presented is a two-frame approach developed to work with small motions. It uses the weighted aggregation procedure of [39] as a platform for segmentation. Finally, the method is efficient, with linear runtime complexity in the number of pixels. Further the utility of the method is demonstrated through experiments on both random dot and real image pairs.

First, attention is focused on motion cues alone and how they are integrated with intensity-based segmentation is discussed hereinafter. The method presented performs motion segmentation by applying a sequence of coarsening steps, each of which further clusters the pixels in the image according to their motion, producing fewer aggregates of pixels of larger sizes. We refer to the aggregates produced by each coarsening step as a level of scale, with the fine levels containing the small aggregates produced after the first few steps of the algorithm, and the coarse levels containing the larger aggregates produced in subsequent steps. The primary objective of these coarsening steps is to determine which collections of pixels share a unified motion. This is achieved by simultaneously resolving motion ambiguities and describing the motion by the appropriate model. At this point although consideration is given only to three types of motions—translation, affine, and rigid transformation in 3D, from the teachings herein, it will be apparent that the invention can be extended to handle 2D-homographies and nonrigid transformations.

Every coarsening step is composed of two parts, clustering and re-estimation. For clustering a set of seed elements is selected, and then associated with every element from the previous level to these seeds by soft assignment. Once the clusters are determined the common motion of the cluster is estimated. Here the parameters of the motion are determined and ambiguities are resolved.

As this iterative coarsening procedure proceeds, gradual modifying of the model used to describe the motion of aggregates occurs. At finer levels, the translation of aggregates is sought to be determined. This is achieved by applying a process of sharpening the raw motion cues. This process allows identifying either the translation of the center of mass of an aggregate or a 1-D constraint on this motion. Later on, as sufficient translational information is accumulated, this information is used to determine more complex motions, including affine transformation and rigid motion in 3D.

Below is described the different components of the algorithm.

Figure 29:
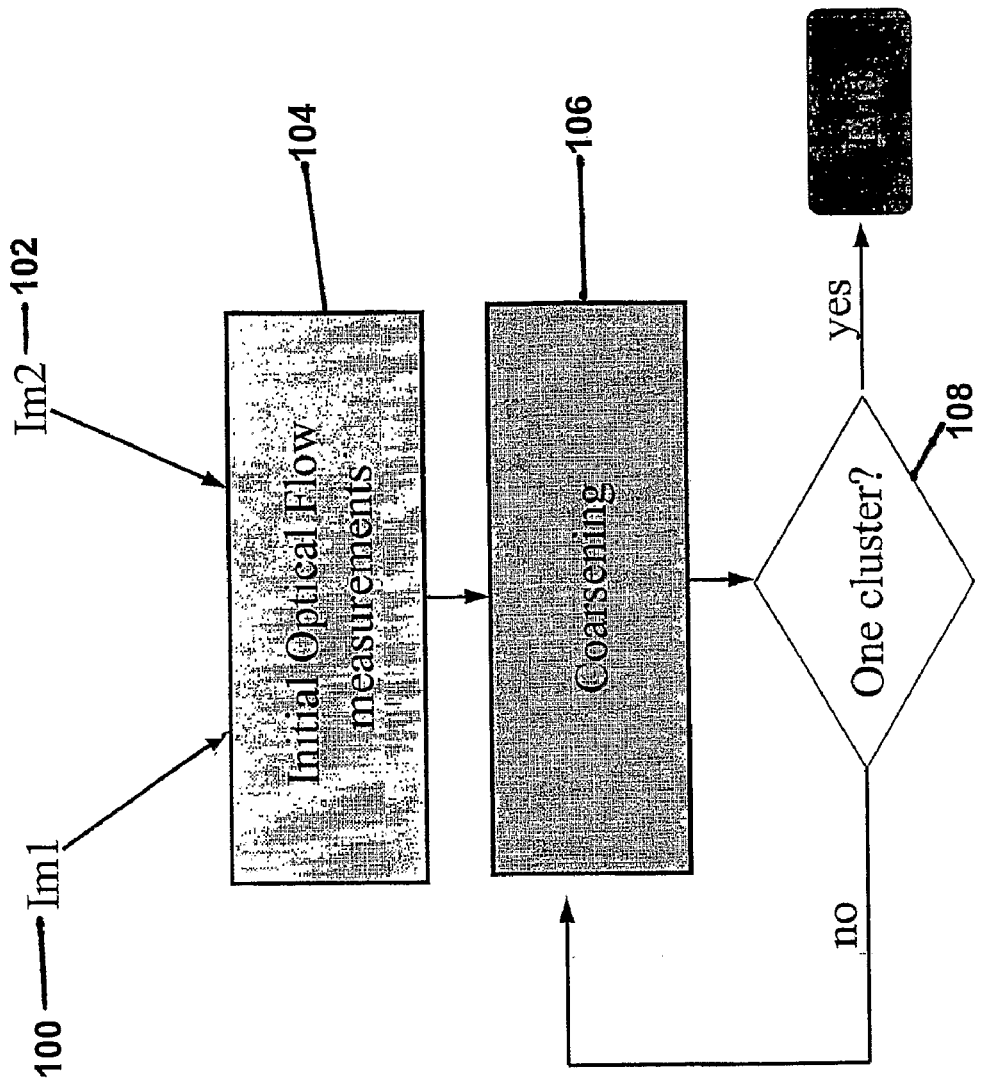

Initial Optical Flow Measurements, Block 104 of FIG. 29

Measuring optical flow is complex, partly because local information usually is insufficient to determine the motion of a given pixel. In particular, pixels near edges are subject to a 1-D aperture ambiguity, and pixels within uniform regions are subject to a 2-D ambiguity. To represent this ambiguity the method follows the method of [40] and represent the initial optical flow measurements as a motion profile.

Let $Im_1$ and $Im_2$ denote the two input images, 100 and 102 see FIG. 29. Using homogeneous coordinates, let $x_i=(x_i,y_i,1)^T$ denote a pixel in $Im_1$. The motion profile $M_i(u)$ is a normalized 2-D histogram reflecting our estimate of the probability that the optical flow at $x_i$ is given by $u=(u,v,0)^T$. To estimate this histogram the method compares a 3×3 window from $Im_1$ centered at $x_i$ with similar windows in $Im_2$ centered at offsets u within a bounded distance from $x_i$. Using the SSD (sum of squares distance) between the intensities in the two windows the method sets the motion profile to be $$M_i(u) = \frac{1}{Z}(e^{-\alpha SSD(Im_1(x_i),Im_2(x_i+u))} + C). \quad (1)$$

The constant α controls the penalty due to difference in intensity; assuming brightness constancy, α should be set according to the level of noise in the images. The constant term C is added to ensure that no offset is assigned zero probability (since there is always a chance that the pixel changes its intensities after motion, e.g., due to occlusion). Finally, Z is a normalizing factor set to ensure that the entries in the histogram sum to 1. The method can in general use a prior to modulate this expression (e.g., incorporating small motion assumption). In this implementation the method used a uniform prior, resulting in the expression (1). Another issue is how to initialize the motion profile of pixels near the boundaries of the image. Denote by k the number of cells contained in a profile, the method assigned 1/k to each cell corresponding to motion that exceeds the boundaries of the image. The rest of the cells are assigned proportionally to the expression (1).

Optical Flow Disambiguation

To handle translation, the method makes the simplifying assumption that pixels provide independent information about their motion, and use this assumption to evaluate which pixels should cluster together. According to this independence assumption, the joint probability that two pixels $x_i$ and $x_j$ with motion profiles $M_i$ and $M_j$ share a common translation u is given by $M_i(U)M_j(u)$. In reality, it may want to cluster together neighboring pixels that share a common motion even if this motion is non-translational (e.g., rotation). To account for small deviations from translation, and to account for noise, first smooth the two motion profiles before taking their product. Denote by $g(M(u))=G*M(u)$, where G denotes a Gaussian function with zero mean and a small standard deviation σ (we used σ=0.5), and '*' denotes convolution. Then the chance that two pixels share roughly the same translation is given by $$g(M_i(u))g(M_j(u)). \quad (2)$$

To evaluate the resemblance of the motion profiles of two neighboring pixels the method follows [40] and defines a measure based on the normalized correlation between the profiles. Define the similarity between two profiles as $d_{profile}=1-g(M_i(u))g(M_j(u))$ and $$w_{ij}=e^{-\beta d_{profile}}, \quad (3)$$

where β is a scaling factor. At the finest level each pixel is connected to its four immediate neighbors with $w_{ij}>0$, and every furthest pairs satisfy $w_{ij}=0$.

Coarsening, See Block 106 FIG. 29

Each coarsening step begins by selecting a subset of the elements from the previous level (pixels in the finest level, aggregates of pixels in higher levels) as seeds, with the constraint that all other elements are strongly associated with (subsets of) these seeds (using the similarity in (3) as a measure of association). The method further prescribes an association weight $p_{ik}$ to express the strength of association of a finer element i to a coarser seed k:

$$p_{ik} = \frac{w_{ik}}{\sum_l w_{il}}, \quad (4)$$

where the denominator is summed over all seeds. Note the values $p_{ik}$ are positive only in a close neighborhood of each element.

Once all the association weights are determined the method can construct a common motion profile for the new aggregates. By generalizing (2) obtain $$M_k(u) = \frac{1}{Z}\prod_i g(M_i(u))^{p_{ik} V_i/\bar{V}}. \quad (5)$$

According to this expression the motion profile of an aggregate k is given by the product of all the motion profiles of its children, where the power weighs each term according to the strength of association of a child to the seed and accounts for its volume (with $V_i$ the volume of child i and $\bar{V}$ the average volume of an aggregate in its level). Z is the appropriate normalizing constant. With this formula the motion profile of a pixel is distributed between all the seed it is associated with.

This coarsening process, which is composed of seed selection, associating elements with the seeds, and computing new motion profiles, is repeated creating at every subsequent level fewer aggregates of larger sizes. Expressing the motion profile of these aggregates as a product of the profiles of their children results in a sharp decrease of the probabilities of incompatible motions relative to that of the correct translation. In textured regions it is often sufficient to perform one or two coarsening steps to obtain a sharply peaked motion profile. In contrast, motion profiles within uniform regions usually remain ambiguous until either the aggregation process combines them with areas that contain features or the entire uniform region is clustered. Combining this process with intensity based segmentation, as described above, ensures the clustering of both uniform regions and texture features, and this in turn assists in obtaining meaningful optical flow measurements.

During this aggregation process the motion profile of each of the aggregates in each level is examined to determine if its profile is sharply peaked, in which case the aggregate is labeled as peaked and set the optical flow for the center of the aggregate according to the location of the peak. If a profile is not sharply peaked it is further examined it to test whether it contains a line with elevated probability values. In that case it is concluded that the aggregate is subject to an aperture problem. It is thus labeled that the aggregate is bar-peaked and associate a normal flow vector to the center of the aggregate according to the parameters of this line.

Affine Transformation

As the method proceeds with the aggregation process, the size of aggregates increases, and translation ceases to accurately reflect their motion. Therefore a more complex model is used to describe this motion. This is done by fitting an affine transformation for each aggregate. Unfortunately, the motion profile of an aggregate cannot be used to determine its affine motion since it does not contain sufficient degrees of freedom. Instead, constraints from the peaked and bar-peaked sub-aggregates are accumulated, and use these constraints to determine the affine motion.

Specifically, suppose the flow at a point $x_i$ is given by u. Fit a 3×3 matrix A that satisfies $Ax_i=u$ (with the last row of A containing (0,0,0)). There are two weights one needs to take into account. The first is the degree to which $x_i$ (which denotes the center of mass of some sub-aggregate i a few levels down) belongs to the aggregate k for which the computation is performed. Generalizing (4) to i and k separated by any number of levels, denote this weight by $p_{ik}$. The second weight reflects belief in the optical flow measurement, as is expressed in the motion profile, given by $M_i(u)$. Incorporating these weights the method seeks a matrix A that minimizes $$\min_A \sum_i \sum_u p_{ik} M_i(u) \|Ax_i - u_i\|^2, \quad (6)$$

with the summation going over all sub-aggregates i and their motion profiles u. Taking derivatives with respect to A the method obtains $$A\left(\sum_i p_{ik} x_i x_i^T\right) = \sum_i \sum_u p_{ik} M_i(u) u x_i^T. \quad (7)$$

This and subsequent derivations can be obtained using $\partial y^T Ax/\partial A = yx^T$, and $\partial y^T A^T Ax/\partial A = A(yx^T + xy^T)$ This provides a set of six equations in the six unknown components of A, which uses moments of points up to second order (left hand side) and bilinear moments of their motion (right hand side). These moments are collected from the peaked and bar-peaked sub-aggregates of all finer levels using their motion profiles.

To obtain these moments, apply a process of accumulation in which the moments computed at every level are used to compute the moments of the subsequent level. A straightforward accumulation of moments may result in bias, as the motion profile can suffer from noise or the motion profile may still be ambiguous. Therefore apply a selective moment aggregation in a way that only peaked or bar-peaked sub-aggregates contribute to the moment accumulation. An aggregate is labeled as peaked (or bar-peaked) by heredity if at least one of its strongly-related children is labelled peaked. In this case its moments are computed as a weighted sum of the moments of its peaked (or bar-peaked) children. If an aggregate is not labeled peaked (or bar-peaked) by heredity it is further examined, if most of the energy in its motion profile is concentrated around a single location (or a line), in which case the aggregate is labeled as peaked (respectively bar-peaked) and initialize its moments using the following expression:

$$\sum_u M_k(u) x^{\delta_1} y^{\delta_2} u^{\delta_3} v^{\delta_4}, \quad (8)$$

where (x,y) are the center of mass of the aggregate, $\delta_j \geq 0$ are integers and $\Sigma \delta_j \leq 2$. Note that the moments accumulated this way adaptively collect information from aggregates of different scales.

The zero order moment indicates the number of points contributing to the moments. Since a peaked aggregate contributes two equations and a bar-peaked contributes one equation, the zero order moment can be used to determine if a sufficient number of points have been identified to determine an affine transformation. Whenever it is detected that aggregates for which there are no sufficient constraints to determine an affine transformation, assign to them the identity matrix for the linear part and translation according to the constraints available. If no constraints are available these aggregates are considered as stationary.

Once the motion of aggregates by an affine transformation is described further coarsening requires comparing these motions. A simple way to compare affine transformations is by directly comparing their components. However, a significant difference in the components of a transformation may not necessarily imply a similar difference in the effect of the transformation. To account for this two affine transformations are compared by the difference between the motions they induce on the relevant aggregates. A top-down process is used in which sub-aggregates are examined at two finer levels down. Denote by $A_k$ the affine transformation of aggregate k, and the center of mass of its sub-aggregates (two levels down) by $x_i=(x_i,y_i,1)^T$ and their respective association weights to k by $p_{ik}$. The (non-symmetric) difference between the affine transformations assigned to aggregates k and l, $d_{kl}$, is defined as $$d_{kl} = \left(\frac{\sum_i p_{ik}((I+A_k)x_i - (I+A_l)x_i)^2}{\sum_i p_{ik}}\right)^{\frac{1}{2}}. \quad (9)$$

Similarly, the difference in the other direction $d_{lk}$ is calculated. The joint affine transformation distance between the aggregates k and l is $$d_{affine} = \min(d_{kl}, d_{lk}). \quad (10)$$

From a certain level on we substitute $d_{profile}$ in (3) by this measure.

Fundamental Matrix

Video sequences are often taken with the camera moving. Generically, such a motion produces perspective distortions throughout the image, making it difficult to separate the moving objects from a stationary background. To account for this compute for each aggregate at the top-most levels a fundamental matrix and compare the obtained matrices in an attempt to cluster together segments describing stationary portions of the scene. Below is described how this fundamental matrix is computed and compared.

Using the same notation introduced in the previous section seek a 3×3 rank 2 matrix F that minimizes $$\min_F \sum_i \sum_u p_{ik} M_i(u)((x_i + u)^T F x_i)^2. \quad (11)$$

Taking derivatives with respect to F to obtain $$\sum_i \sum_u p_{ik} M_i(u)((x_i + u)^T F x_i)(x_i + u)x_i^T = 0. \quad (12)$$

This provides a set of nine homogeneous equations in the components of F, which uses motion moments of points up to fourth order (defined as in (8) with $0 \leq \delta_j \leq 4$).

Collect these moments from the sharp sub-aggregates only. (The bar-peaked sub-aggregates generally do not constrain the fundamental matrix since the constraint line may intersect many epipolar constraints.) Solve the equation using the eight point algorithm using the normalization procedure proposed by Hartley [35] followed by rank reduction. Degeneracies can be handled as in [43].

The calculation of the fundamental matrix is followed by a comparison of the fundamental matrices between two neighboring aggregates. In this case it is not straightforward to apply the same comparison procedure used in the affine case, since a fundamental matrix provides only a line constraint on the location of each point. Therefore chose to use the simpler method of comparing the entries of the two matrices using an $l_2$ norm. The resulting measure, $d_{fundamental}$ is then use to replace $d_{profile}$ in (3).

Finally, an outline of the novel motion segmentation algorithm is provided in Table 1.

Table 1. Outline of the Motion Segmentation Algorithm
Motion Segmentation:
 Given two images $Im_1$ and $Im_2$, prepare for each pixel in $Im_1$ a motion profile (1).
 Assign a weight to each pair of neighboring pixels according to the normalized correlation between their motion profiles (3).
Coarsening Iteration:
1. Clustering:
 (a) Select a set of seeds such that the remaining elements are strongly connected to this set.
 (b) Define the strength of association of a fine element i to a coarse seed k (4).
2. Re-estimation: For each seed
 (a) Calculate the motion profile of the seed by multiplying the profiles of its children (5).
 (b) Examine whether the seed is peaked, by heredity or by itself.
 (c) If it is not peaked check if it is bar-peaked, by heredity or by itself.
 (d) Accumulate adaptively, moments (orders one to four) originated by peaked seeds.
 (e) Accumulate separately, moments (orders one and two) originated by bar-peaked seeds.
 (f) If there is enough statistics, calculate affine transformation by merging moments from peaked and bar-peaked profiles.
 (g) If there is enough statistics, calculate fundamental matrix from peaked profiles.
3. Calculate for each neighboring seeds cross correlation distance, affine transform distance and fundamental matrix distance.
4. Modify appropriately the similarities between neighboring seeds.

Using Intensity Cues

To combine motion with intensity cues integrate the motion segmentation algorithm with the Segmentation by Weighted Aggregation (SWA) algorithm [39]. This algorithm has been extended to also handle texture cues [32], although the implementation did not make use of these cues. Below is described first the main principles behind the SWA algorithm, and then how to combine motion with intensity cues in this framework.

SWA Segmentation

The SWA algorithm is a multiscale graph partitioning algorithm. Given an image, it constructs a graph G=(V,W), with nodes in V representing image pixels and the symmetric edge weight matrix W representing the affinities between neighboring pixels. To evaluate segments it defines a saliency measure as follows. Every node $v_i$, ($1 \leq i \leq N$, where $N = \|V\|$) is associated with a state variable $u_i$, and every candidate segment $S = \{v_1, v_2, \ldots, v_m\} \subseteq V$ is associated with a state $u = (u_1, u_2, \ldots, u_N)$ such that $$u_i = \begin{cases} 1 & \text{if } v_i \in S \\ 0 & \text{if } v_i \notin S. \end{cases} \quad (13)$$

The saliency associated with S is defined by $$\Gamma(S) = \frac{u^T L u}{\frac{1}{2} u^T W u}, \quad (14)$$

where L is the Laplacian matrix whose elements are $$l_{ij} = \begin{cases} \sum_{k(k \neq i)} & i = j \\ -w_{ij} & i \neq j. \end{cases} \quad (15)$$

This saliency measure sums the weights along the boundaries of S normalized by the internal weights. Segments that yield small values of $\Gamma(S)$ are considered salient. Allowing arbitrary real assignments to u the minimum for $\Gamma$ is obtained by the minimal generalized eigenvector u of $$Lu = \lambda W u. \quad (16)$$

with the condition that $\lambda > 0$.

The SWA algorithm finds the best partitions (0-1 assignments of u by recursively producing smaller representative sets of seeds, such that every pixel is strongly-connected to the set of seeds. Denote by $U = (U_1, U_2, \ldots, U_n)$ the coarse level state vector. Construct a sparse, N×n matrix P such that $$u \approx PU. \quad (17)$$

P is called the inter-scale interpolation matrix. Using this matrix the saliency measure $\Gamma$ can be written as $$\Gamma = \frac{u^T L u}{\frac{1}{2} u^T W u} \approx \frac{U^T P^T L P U}{\frac{1}{2} U^T P^T W P U}. \quad (18)$$

To calculate the right hand side of this equation compute the matrix $P^T W P$, which is a coarse representation of the original weight matrix. This is called weighted aggregation. Exploiting the sparseness of P, this product is computed in linear time.

Combining Motion with Intensities

In this portion of the disclosure the superscripts M and I are attached to denote measures corresponding to motion and intensity information respectively. The multiscale partitioning procedure described in the previous section can be used for segmentation combining motion and intensity cues in the following way. Given a pair of images, begin by constructing a 4-connected graph G=(V,W), where every pixel is represented by a node $v_i \in V$, and every pair of neighboring pixels are connected with an edge with weight $w_{ij}$. This weight is a product of two term. A measure reflecting the contrast between the two pixels i and j in $Im_1$, e.g., $$w_{ij}^I = e^{-\beta |I_i - I_j|}, \qquad (19)$$

where $I_i$ and $I_j$ denote the intensities of the two neighboring pixels, and $\beta$ is a positive constant, and a measure $w_{ij}^M$ reflecting the difference in the motion profiles associated to the two pixels (3).

At each coarsening step, first determine the next coarser graph using the weighted aggregation procedure. This will produce a graph that is roughly equivalent to the finer level graph, with weights inherited from the previous level. Then modify the weights in the new graph to incorporate coarser measures of differences between neighboring aggregates. Specifically, for every two aggregates multiply these weights by the a measure of difference between their average intensities and possibly their variance (of the form similar to (7)), and likewise by a measure reflecting the difference between their motion profiles (3), and at higher scales the difference between their affine transformations and fundamental matrices.

Experiments

The combined algorithm was implemented and applied it to a collection of image pairs. (The image pairs can be seen in motion in the supplementary file.) The parameters were set around the following values: $\alpha=10$, $\beta=4$, $\hat{\beta}=7$. The motion profile distance $d_{profile}$ was evaluated from the finest scale to scale 4. The affine distance $d_{affine}$ was evaluated from a scale 5, and $d_{fundamental}$ was applied at the two topmost levels. The non-optimized implementation runs in less than 10 seconds on a 200×250 on a Pentium 4 PC. To demonstrate the handling of motion cues alone first apply the algorithm to several pairs of images containing a moving sequence of random dots. FIG. 23 shows a random dot sequence containing a pair of translating squares on a stationary background along with segmentation results (displayed by a color overlay on top of the leftmost picture) and motion vectors computed by the algorithm.

In this and other examples the motion vectors extracted were identified in peaked aggregates at levels 4-5. The bar-peaked aggregates are not displayed in these images. A similar display is shown in FIG. 24, which contains a central rotating square on a stationary background.

FIG. 25 contains a random dot sequence of an internal sphere placed within a spherical room. (The "camera" is picturing the scene from within the larger scene.) The two spheres translate in 3D in different directions. The use of fundamental matrices was critical in this case for obtaining the outer sphere in one piece. This sphere was obtained in several pieces when only the affine transformation was used. The rest of the FIGS. 26-28 show the results obtained with the method on real motion pairs. FIG. 26 shows a car existing to a street with some camera motion. Using intensity alone resulted in attaching the dark top of the car with the background. Using also motion cues the car is segmented in one piece (although the wheels were incorrectly attached to the background). The figure further shows the epipolar lines computed with our method for the background segment. In the next example (FIG. 27) the motion pair is blurred resulting in bleeding (the woman's face is segmented with the background) when only intensity cues are employed, where as motion cues caused the face and the hair to come out in one piece. In FIG. 28 the arm of the octopus was connected in one piece despite a dark section in the middle mainly because of continuity in motion.

FIG. 29 shows a high level flowchart in which two images Im1 and Im2, 100 and 102, respectively are input into the Initial Optical measurements block 104 and processed as described above. Then the output of block is input to the Coarsening operations described above in block 106. Thereafter the output of block 106 is passed to a decision 108 of whether one cluster has been achieved. If the answer is yes, the program ends. If the answer is no, the program loops back to the Coarsening block 106 for further processing as described above.

Figure 30:
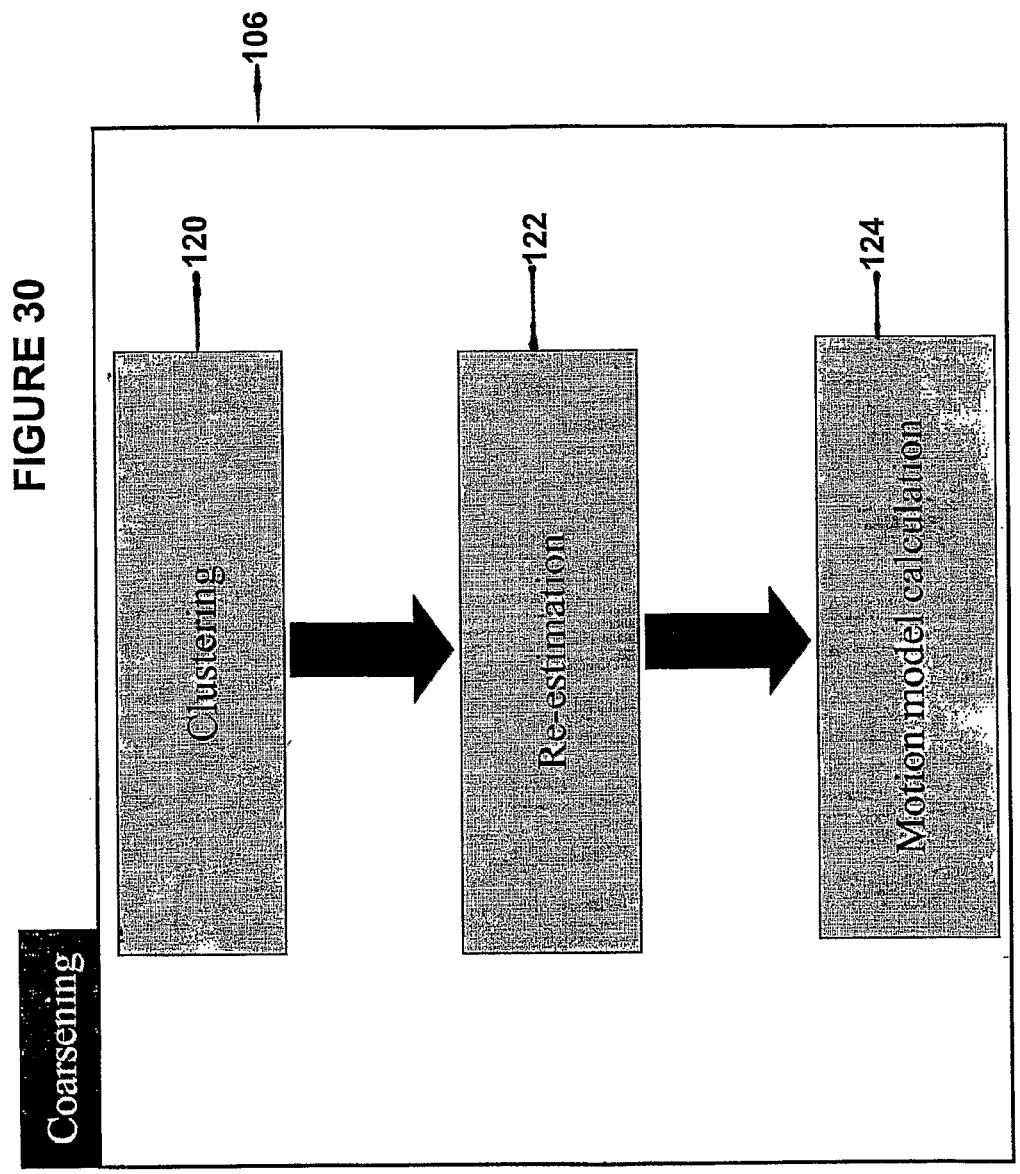

FIG. 30 is a flowchart showing at a high level the program of Coarsening. In the first step represented by block 120, clustering takes place as described above. The output of the clustering process is input to the re-estimation block 122 where re-estimation takes place in the manner described above. The output of the re-estimation is input to the motion model calculation block 124, and the program proceeds as described above.

Figure 31A:
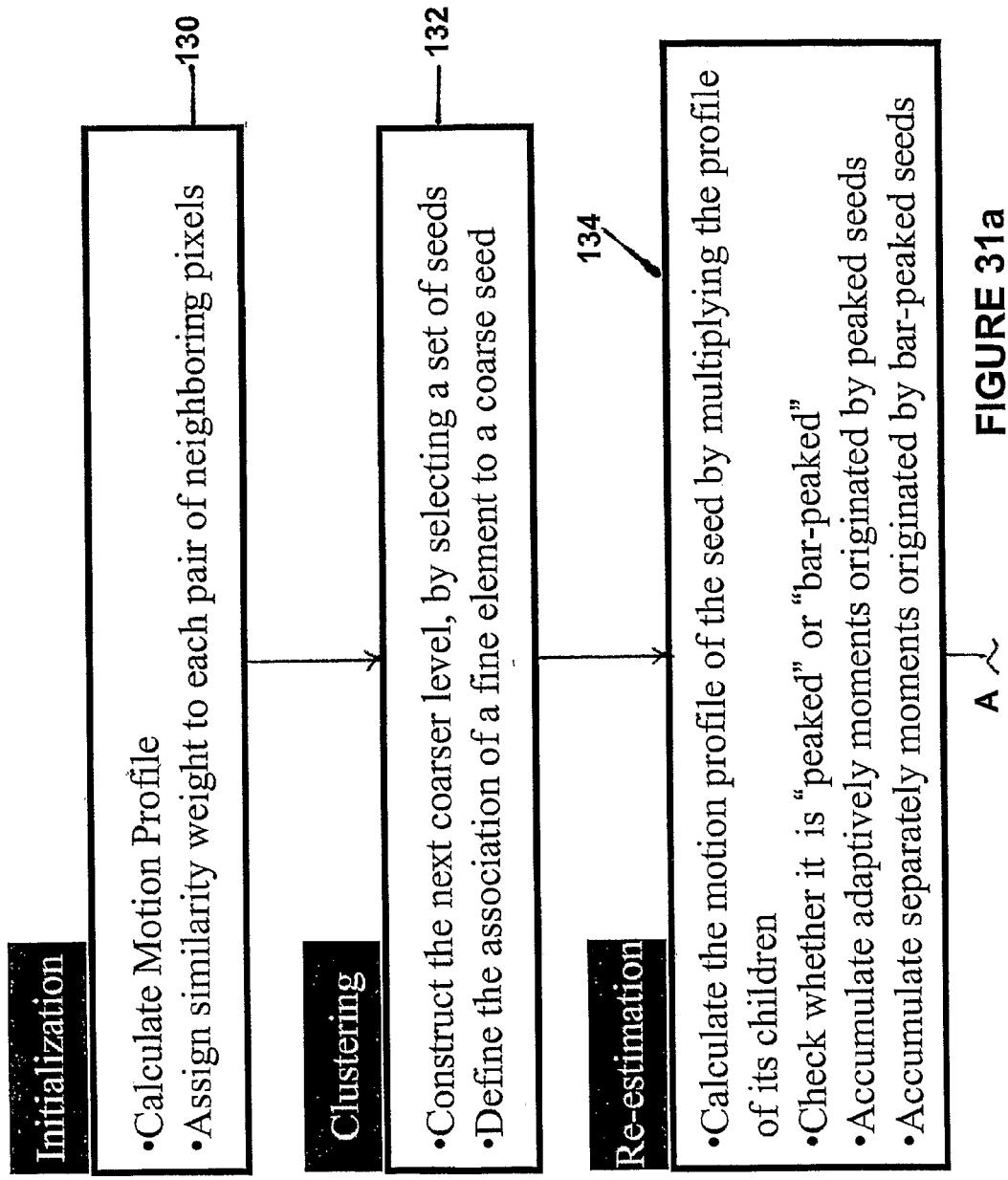
Figure 31B:
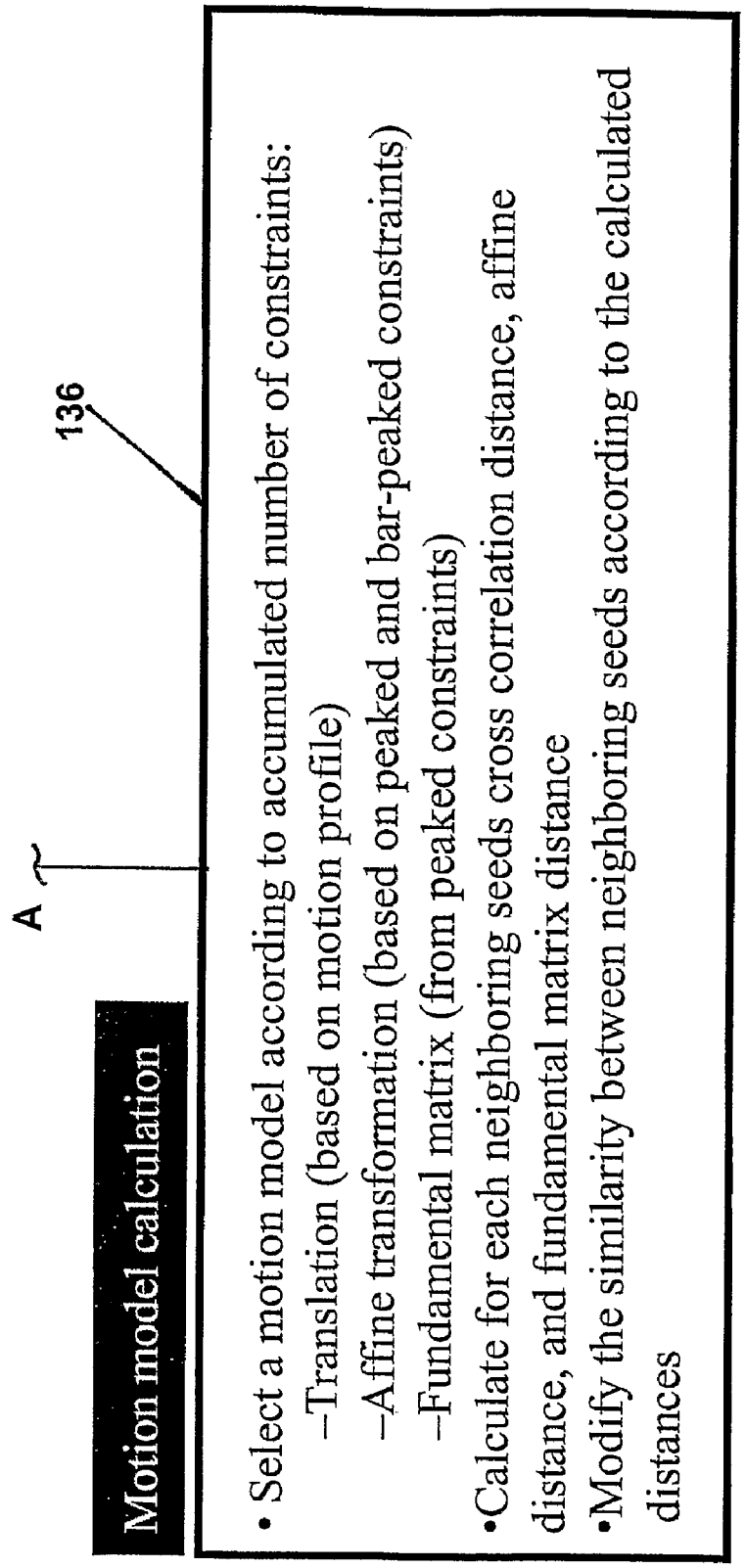

The program shown by FIG. 30 is shown in greater detail in FIGS. 31a and 31b. First, in the initialization in block 130 the program calculates motion profile and assigns similarity weight to each pair of neighboring pixels. The output is input to the clustering block 132 where the program proceeds to construct the next coarser level by selecting a set of seeds. Then the association of a fine element to a coarse seed is defined. The output of the clustering block 132 is input into the re-estimation block 134 wherein the program proceeds to calculate the motion profile of the seed by multiplying the profile of its children. Next the program checks whether it is "peaked" or "unpeaked". Then the program proceeds to accumulate adaptively moments originated by peaked seeds. Next the program proceeds to accumulate separately moments originated by bar-peaked seeds. The output of the re-estimation is input to the motion model calculation block 136 wherein the program proceeds to select a motion according to accumulated number of constraints:

Translation (based on motion profile)
Affine transformation (based on peaked and bar-peaked constraints)
Fundamental matrix (from peaked constraints).

Next the program calculates for each neighboring seeds cross correlation distance, affine distance, and fundamental matrix distance. Finally, the program proceeds to modify the similarity between neighboring seeds according to the calculated distances.

CONCLUSION

Presented is an efficient multiscale algorithm for image segmentation that combines motion with intensity cues. The algorithm uses bottom-up processing to disambiguate motion measurements and determine an appropriate motion model for various regions in the image. The algorithm has been demonstrated by applying it to a variety of random dot and real motion pairs.

The novel algorithm is related to several existing algorithms. Initial motion measurements are represented in the form of motion profiles and apply a graph algorithm to find minimal cuts in the graph (as in [40]) using the algorithm proposed in [39]. In addition, similar to layer approaches [44,46,25,45] the algorithm is composed of a sequence of clustering and re-estimation steps. However, unlike these methods, the inventive method uses coarsening steps to disambiguate motion measurements and to adaptively select a motion model according to the amount of statistics available. Because each coarsening step reduces the number of clusters handled by the algorithm, the algorithm is linear in the number of pixels in the image. The inventive method can be easily extended in several ways. First, it can be extended to handle sequences composed of three or more frames, e.g., by applying the same method on a 3D graph which represents the pixels in the entire sequence. Motion measurements at all levels can be more robustly computed by applying robust estimation techniques. A top-down scan of the pyramid can be applied to obtain a dense motion field. The method can be used to recover the 3D structure of a scene by using the motion vectors in conjunction with the epipolar constraints to determine disparities. Another straightforward extension is to incorporate 2D homographies as a motion model to correctly segment planes and to identify the background in the case of camera rotation. The method already accounts for some non-rigid deformations by allowing for stretch and skew in the affine model and by clustering neighboring aggregates when these have similar motion (see, e.g., the arm of the octopus, which is moving non-rigidly, yet it is segmented in one piece). More complex deformation models can also be incorporated in the method. Also of importance is to handle the "edge assignment" problem in order to determine for boundary edges to which segment their motion is relevant. This is important particularly in uniform regions when almost no supporting features exist in addition to the boundary edges. The use of 1×1 windows instead of 3×3 to initialize the motion profiles can alleviate this problem. Finally, learning approaches can be incorporated to automatically set the parameters of this process.

Although the invention has been shown and described in terms of specific embodiments, changes are possible that do not depart from the inventive teachings. Such are deemed to fall within the purview of the invention as claimed.

REFERENCES FOR FIRST VERSION

[1] Adam Baumberg, 2000. Reliable feature matching across widely separated views. CVPR: 774-781.
[2] Moon Jung Chung, 1987. $0(n^{2.5})$ time algorithm for the subgraph homeomorphism problem on trees. Journal of Algorithms, 8: 106-112.
[3] Laurent Cohen, Laurent Vinet, Peter T. Sender and Andre Gagalowicz, 1989. Hierarchical region based stereo matching. CVPR: 416-421.
[4] David Dupplaw and Paul Lewis, 2000. Content based image retrieval with scale space object trees. SPIE: Storage and Retrieval for Medical Databases: 253-261.
[5] David Forsyth, Jitendra Malik and Robert Wilensky. 1997. Searching for digital pictures. Scientific American, June: 7277.
[6] V. Gouet, P. Montesinos and D. Pete, 1998. A fast matching method for color uncalibrated images using differential invariants. BMVC: 367-376.
[7] http://www.mpi-sb.mpg.de/LEDA/
[8] P. Lipson, E. Grimson and P. Smnha, 1997. Configuration based scene classification and image indexing. Proceedings of IELE Conference on Computer Vision and Pattern Recognition.
[9] Jianbo Ma and Narendra Ahuja, 2000. Region correspondence by global configuration matching and progressive delaunay triangulation. CVPR: 637-642.
[10] J. Matas, J. Burianek and J. Kittler, 2000. Object recognition using the invariant pixel-set signature. BMVC.
[11] J. Matas, O. Chum, M. Urban and T. Pajdla, 2001. Distinguished regions for wide-baseline stereo. Technical report CTU-CMP-2001-33.
[12] J. Matas, S. Obdzalek and O. Churn, 2002. Local affine frames for wide-baseline stereo. ICPR.
[13] K. Mikolajczyk and C. Schmid, 2002. An affine invariant interest point detector. ECCV: LNCS 2350: 128-142.
[14] Marcello Pelillo, Kaleem Siddiqi and Steven W. Zucker, 1999. Matching hierarchical structures using association graphs. PAMI, 21(11): 1105-1120.
[15] Philip Pritchett and Andrew Zisserman, 1998. Wide baseline stereo matching. ICCV: 754-760.
[16] Gerhard Roth and A. Whitehead, 2000. Using projective vision to find camera positions in an image seqeuence. Vision Interface Conference: 87-94. Projective Vision Toolkit Homepage. http://www2.vit.iit.nrc.caJ gerhard/PVT/.
[17] Erez Sali and Shimon Ullman, 1999. combining class specific fragments for object classification. BMVC: 203-213.
[18] Cordelia Schmid and Roger Mohr, 1997. Local gray value invariants for image retrieval. PAMI, 19(5): 530-535.
[19] Frederik Schaffalitzky and Andrew Zisserman, 2001. Viewpoint invariant texture matching and wide baseline stereo. ICCV.
[20] Eitan Sharon et al, 2000. Fast multiscale image segmentation. CVPR:70-77.
[21] Eitan Sharon et al, 2001. Segmentation and Boundary Detection Using Multiscale Intensity Measurements. CVPR.
[22] Ali Shokoufandeh et al, 2002. On the representation and matching of qualitative shape at multiple scales. ECCV
[23] Jean-Philippe Tarel and Jean-Marc Vezien, 1995. A generic approach for planar patches stereo reconstruction. Scandinavian Conference on Image Analysis: 1061-1070.
[24] D. Tell and S. Carlsson, 2002. Combining appearance and topology for wide baseline matching. ECCV.
[25] Tinne Tuytelaars and Luc Van Gool, 2000. Wide baseline stereo matching based on local, affinely invariant regions. BMVC: 412-425.

REFERENCES FOR SECOND VERSION

[26] S. Ayer, H. S. Sawhney, Layered Representation of Motion Video Using Robust Maximum-Likelihood Estimation of Mixture Models and MDL Encoding, *ICCV:* 777-784, 1995.
[27] M. J. Black, A. Jepson, Estimating optical flow in segmented images using variable-order parametric models with local deformations, *PAMI,* (10): 972-986, 1996.
[28] T. Brox, A. Bruhn, N. Papenberg, J. Weickert, High accuracy optical flow estimation based on a theory for warping, *ECCV:* 25-36, 2004.
[29] J. Costeira and T. Kanade, A Multi-body Factorization Method for Motion Analysis, *IJCV* (3): 159-179, 1998.
[30] D. Cremers, A Variational Framework for Image Segmentation Combining Motion Estimation and Shape Regularization, *CVPR* I: 53-58, 2003.

[31] C. Fowlkes, S. Belongie, F. Chung, J. Malik. Spectral Grouping using the nystr?m method", *PAMI*, (2): 214-225, 2004.
[32] M. Galun, E. Sharon, R. Basri, A. Brandt, Texture segmentation by multiscale aggregation of filter responses and shape elements, *ICCV*: 716-723, 2003.
[33] C. W. Gear, Multibody grouping from motion images, *IJCV*, (29): 133-150, 1998.
[34] A. Gruber, Y. Weiss, Multibody factorization with uncertainty and missing data using the EM algorithm, *CVPR*, :707-714, 2004.
[35] R. I. Hartley, In Defense of the Eight-Point Algorithm, *PAMI*, (6): 580-593, 1997.
[36] K. Kanatani, Evaluation and selection of models for motion segmentation. *ECCV*: 335-349, 2002.
[37] M. Pawan Kumar, P. H. S. Torr, A. Zisserman, Learning Layered Pictorial Structures from Video
[38] M. Irani, B. Rousso, S. Peleg, Detecting and tracking multiple moving objects using temporal integration, *ECCV*: 282-287, 1992.
[39] E. Sharon, A. Brandt, R. Basri, Segmentation and boundary detection using multiscale intensity measurements, *CVPR*, I:469-476, 2001.
[40] J. Shi, J. Malik, Motion segmentation and tracking using normalized cuts" *ICCV*: 1154-1160, 1998.
[41] P. H. S. Torr, A. W. Fitzgibbon, A. Zisserman, Maintaining Multiple Motion Model Hypotheses Over Many Views to Recover Matching and Structure, *ICCV*: 485-491 1998.
[42] W. S. Tong, C. K. Tang, G. Medioni, Simultaneous Epipolar Geometry Estimation and Motion Segmentation by 4D Tensor Voting in Joint Image Space, *PAMI*, (9), 1167-1184, 2004.
[43] P. H. S. Torr, A. Zisserman, S. Maybank, Robust Detection of Degenerate Configurations for the Fundamental Matrix, *CVIU*, (3): 312-333, 1998.
[44] J. Y. A. Wang, E. H. Adelson, Representing Moving Images with Layers. *IEEE Trans. on Image Processing*, (5):625-638, September 1994.
[45] Y. Weiss, Smoothness in Layers: Motion segmentation using nonparametric mixture estimation. *CVPR*, 520-527, 1997.
[46] Y. Weiss, E. H. Adelson, A unified mixture framework for motion segmentation: incorporating spatial coherence and estimating the number of models. *CVPR*, 321-326, 1996.
[47] L. Zelnik-Manor, M. Machline, M. Irani, Multi-Body factorization with uncertainty: revisiting motion consistency, *IJCV*, 2004.

What is claimed is:

1. A method for finding correspondence between portions of two images comprising the steps of a) subjecting the two images to segmentation by weighted aggregation, b) constructing directed acylic graphs from the output of the segmentation by weighted aggregation to obtain hierarchical graphs of aggregates, and c) applying a maximally weighted subgraph isomorphism to the hierarchical graphs of aggregates to find matches between them using two algorithms, one seeking a one-to-one matching between regions, the other computing a soft matching that is an aggregate may have more than one corresponding aggregate, and d) recovering epipolar lines and camera motion using such correspondences.

2. Apparatus for finding correspondence between portions of two images comprising: means for subjecting the two images to segmentation by weighted aggregation to obtain full multiscale pyramidal representations of the images, means for constructing directed acylic graphs from the full multiscale pyramidal representations of the images to obtain hierarchical graphs of aggregates, means for applying a maximally weighted subgraph isomorphism to the hierarchical graphs of aggregates to find matches between them using an algorithm that matches between regions, and means for recovering epipolar lines and camera motion using such correspondences.

3. Apparatus according to claim 2, wherein the algorithm computes a soft matching such that an aggregate may have more than one corresponding aggregate.

4. Apparatus according to claim 2, wherein the algorithm computes a one-to-one matching between regions.

5. A method for finding correspondence between portions of two images comprising the steps of: e) subjecting the two images to segmentation by weighted aggregation employing a series of coarsening in successively coarser levels, f) modifying the weights in each successive level to incorporate coarser measures of difference between neighboring aggregates based on a measure of difference between their average intensities and by a measure reflecting their motion profiles, and g) recovering at the highest level a representation of the correspondence between the portion of the two images.

6. A method according to claim 5 wherein the weight is determined according to $$w_{ij}^I e^{-\beta |I_i - I_j|},$$

where $I_i$ and $I_j$ denote the intensities of the two neighboring pixels, and $\hat{\beta}$ is a positive constant, and a measure $w_{ij}^M$ reflecting the difference in the motion profiles associated to the two pixels.

7. Apparatus for finding correspondence between portions of two images comprising: a. means for subjecting the two images to segmentation by weighted aggregation employing a series of coarsening in successively coarser levels, b. means for modifying the weights in each successive level to incorporate coarser measures of difference between neighboring aggregates based on a measure of difference between their average intensities and by a measure reflecting their motion profiles, and c. means for recovering at the highest level a representation of the correspondence between the portion of the two images.

8. Apparatus according to claim 7 further including: means for determining the weight according to $$w_{ij}^I e^{-\beta |I_i - I_j|},$$

where $I_i$ and $I_j$ denote the intensities of the two neighboring pixels, and $\hat{\beta}$ is a positive constant, and a measure $w_{ij}^M$ reflecting the difference in the motion profiles associated to the two pixels.

9. A method for finding correspondence between portions of two images comprising the steps of: a) select two images $Im_1$ and $Im_2$, b) prepare for each pixel in $Im_1$ a motion profile, c) assign a weight to each pair of neighboring pixels according to a normalized correlation between their motion profiles, d) perform a coarsening iteration by e) clustering and re-estimation wherein clustering is achieved by selecting a set of seeds such that the remaining elements are strongly connected to this set, and defining the strength of association of a fine element i to a coarse seed k, and wherein re-estimation is achieved for each seed by determining the motion profile of the seed by multiplying the motion profiles of its children, determining whether the seed is peaked or bar-peaked, accumulating adaptively, moments (orders one to four) originated by peaked seeds, and accumulating separately, moments (orders one and two) by bar-peaked seeds, and f) determining motion by selecting a model according to constraints from one of translation, affine transformation and fundamental matrix, determining for each neighboring seeds a distance, and modifying the similarities between neighboring seeds according to the determined distance.

10. A method for finding correspondence between portions of two images comprising the steps of: a) select two images $Im_1$ and $Im_2$, b) prepare for each pixel in $Im_1$ a motion profile, c) assign a weight to each pair of neighboring pixels according to a normalized correlation between their motion profiles, d) perform a coarsening iteration to aggregate segments by i. clustering and re-estimation wherein clustering is achieved by selecting a set of seeds such that the remaining elements are strongly connected to this set, and defining the strength of association of a fine element to a coarse seed, and wherein re-estimation is achieved for each seed by determining the motion profile of the seed by multiplying the motion profiles of its children, e) continuing the coarsening iteration until a cluster is detected.

11. A method according to claim 10, wherein the coarsening iteration determines segments adaptively.

12. A method according to claim 10, wherein the coarsening iteration uses bottom-up processing to disambiguate motion profiles.

13. A method according to claim 11, wherein the motion of segments is varied according to a motion model with the level of scale determined by the amount of statistics that appears in each segment.

14. A method according to claim 13, wherein the motion model varies from translation at fine levels, through affine and projective transformations in intermediate levels to 3D rigid motion followed by perspective projection (characterized by a fundamental matrix).

15. A method according to claim 10, wherein the coarsening iteration produces a pyramid and motion is determined by combining constraints collected adaptively from different levels of scales in the pyramid.

16. A method according to claim 10, wherein motion between the images is used to reconstruct a 3D structure of the scene depicted by the images.

17. Apparatus for finding correspondence between portions of two images comprising a computer processor programmed: a. for selecting two images $Im_1$ and $Im_2$, b. for preparing for each pixel in $Im_1$ a motion profile, c. for assigning a weight to each pair of neighboring pixels according to a normalized correlation between their motion profiles, d. for performing a coarsening iteration by e. for clustering and re-estimation wherein clustering is achieved by selecting a set of seeds such that the remaining elements are strongly connected to this set, and defining the strength of association of a fine element i to a coarse seed k, and wherein re-estimation is achieved for each seed by determining the motion profile of the seed by multiplying the motion profiles of its children, determining whether the seed is peaked or bar-peaked, accumulating adaptively, moments (orders one to four) originated by peaked seeds, and accumulating separately, moments (orders one and two) by bar-peaked seeds, and f. for determining motion by selecting a model according to constraints from one of translation, affine transformation and fundamental matrix, determining for each neighboring seeds a distance, and modifying the similarities between neighboring seeds according to the determined distance.

18. Apparatus for finding correspondence between portions of two images comprising a computer processor programmed: a. for selecting two images $Im_1$ and $Im_2$, b. for preparing for each pixel in $Im_1$ a Motion profile, c. for assigning a weight to each pair of neighboring pixels according to a normalized correlation between their motion profiles, d. for performing a coarsening iteration to aggregate segments by ii. clustering and re-estimation wherein clustering is achieved by selecting a set of seeds such that the remaining elements are strongly connected to this set, and defining the strength of association of a fine element to a coarse seed, and wherein re-estimation is achieved for each seed by determining the motion profile of the seed by multiplying the motion profiles of its children, e. for continuing the coarsening iteration until a cluster is detected.

19. Apparatus according to claim 10, wherein the coarsening iteration-determines segments adaptively.

20. Apparatus according to claim 10, wherein the coarsening iteration uses bottom-up processing to disambiguate motion profiles.

21. Apparatus according to claim 11, wherein the motion of segments is varied according to a motion model with the level of scale determined by the amount of statistics that appears in each segment.

22. Apparatus according to claim 13, wherein the motion model varies from translation at fine levels, through affine and projective transformations in intermediate levels to 3D rigid motion followed by perspective projection (characterized by a fundamental matrix).

23. Apparatus according to claim 10, wherein the coarsening iteration produces a pyramid and motion is determined by combining constraints collected adaptively from different levels of scales in the pyramid.

24. Apparatus according to claim 10, wherein motion between the images is used to reconstruct a 3D structure of the scene depicted by the images.

* * * * *